(12) United States Patent
Tanaka

(10) Patent No.: US 8,812,183 B2
(45) Date of Patent: Aug. 19, 2014

(54) DEVICE FOR CONTROLLING HYBRID VEHICLE

(75) Inventor: Keiko Tanaka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 619 days.

(21) Appl. No.: 13/143,168

(22) PCT Filed: Feb. 2, 2009

(86) PCT No.: PCT/JP2009/051728
§ 371 (c)(1),
(2), (4) Date: Jul. 1, 2011

(87) PCT Pub. No.: WO2010/087024
PCT Pub. Date: Aug. 5, 2010

(65) Prior Publication Data
US 2011/0276210 A1 Nov. 10, 2011

(51) Int. Cl.
| | | |
|---|---|---|
| *B60W 20/00* | (2006.01) | |
| *B60K 6/42* | (2007.10) | |
| *B60K 6/22* | (2007.10) | |
| *B60W 10/06* | (2006.01) | |
| *B60W 10/08* | (2006.01) | |
| *B60W 30/194* | (2012.01) | |
| *F01P 3/20* | (2006.01) | |
| *B60K 6/40* | (2007.10) | |
| *B60K 1/02* | (2006.01) | |
| *F01P 11/20* | (2006.01) | |

(52) U.S. Cl.
CPC .......... *F01P 3/20* (2013.01); *B60W 2710/0688* (2013.01); *B60W 10/06* (2013.01); *Y02T 10/6291* (2013.01); *B60L 2240/445* (2013.01); *B60K 1/02* (2013.01); *B60L 2240/34* (2013.01); *B60W 10/08* (2013.01); *B60W 30/194* (2013.01); *B60W 2510/0676* (2013.01); *B60W 2710/088* (2013.01); *F01P 2011/205* (2013.01); *F01P 2050/24* (2013.01); *B60W 20/00* (2013.01); *B60K 6/40* (2013.01); *Y02T 10/84* (2013.01); *Y10S 903/904* (2013.01)

USPC ...... 701/22; 903/904; 180/65.22; 180/65.275

(58) Field of Classification Search
USPC .......................................................... 701/22
See application file for complete search history.

(56) References Cited

U.S. PATENT DOCUMENTS 5,323,868 A * 6/1994 Kawashima ............. 180/65.245
5,966,931 A * 10/1999 Yoshizaki et al. .............. 60/284
(Continued)

FOREIGN PATENT DOCUMENTS

| JP | A-2002-122061 | 4/2002 |
| JP | A-2002-137624 | 5/2002 |

(Continued)

OTHER PUBLICATIONS

International Search Report in International Application No. PCT/JP2009/051728; dated Feb. 24, 2009 (with English-language translation).

(Continued)

*Primary Examiner* — Shelley Chen
(74) *Attorney, Agent, or Firm* — Oliff PLC

(57) ABSTRACT

When the amount of heat stored in a heat storage container is greater than or equal to a determination value at the time of initiation of system start-up in a hybrid vehicle, heating by thermal energy stored in the heat storage container is carried out only on an internal combustion engine. This increases the engine temperature to a permitting temperature for intermittent control of the engine or higher, so that the intermittent control is executed at an early stage after the initiation of the system start-up in the hybrid vehicle. Also, oil viscosity in the engine is rapidly lowered to decrease the resistance to operation of the engine. If the amount of the heat stored in the heat storage container is less than the determination value, the heating by the thermal energy stored in the heat storage container is performed on the transaxle under a prescribed condition. As a result, the fuel efficiency of the engine is improved.

8 Claims, 8 Drawing Sheets

(56) References Cited

U.S. PATENT DOCUMENTS

| | | | |
|---|---|---|---|
| 6,018,199 A * | 1/2000 | Shiroyama et al. | 290/37 A |
| 6,424,053 B1 * | 7/2002 | Wakashiro et al. | 290/40 C |
| 6,543,229 B2 * | 4/2003 | Johansson | 60/605.1 |
| 8,065,069 B2 | 11/2011 | Jinno et al. | |
| 2002/0017098 A1 * | 2/2002 | Johansson | 60/517 |
| 2002/0043410 A1 * | 4/2002 | Suzuki | 180/65.2 |
| 2004/0031452 A1 | 2/2004 | Yamazaki | |
| 2008/0185925 A1 * | 8/2008 | Kurple | 310/54 |
| 2009/0118090 A1 * | 5/2009 | Heap et al. | 477/98 |
| 2009/0140521 A1 * | 6/2009 | Bryan et al. | 290/31 |
| 2010/0076663 A1 * | 3/2010 | Jinno et al. | 701/102 |

FOREIGN PATENT DOCUMENTS

| | | |
|---|---|---|
| JP | A-2003-293769 | 10/2003 |
| JP | A-2004-248402 | 9/2004 |
| JP | A-2007-055299 | 3/2007 |
| JP | A-2008-043094 | 2/2008 |
| JP | A-2008-168805 | 7/2008 |
| JP | A-2008-248741 | 10/2008 |

OTHER PUBLICATIONS

Office Action issued in Japanese Patent Application No. 2010-548350 dated Jun. 5, 2012 (with translation).

* cited by examiner

DEVICE FOR CONTROLLING HYBRID VEHICLE

FIELD OF THE INVENTION

The present invention relates to a control device for a hybrid vehicle.

BACKGROUND OF THE INVENTION

A type of hybrid vehicle has been known in which an internal combustion engine and a motor serving as drive sources, and drive-by-motor operation is carried out by stopping the engine and actuating only the motor as the drive source. Through the drive-by-motor operation, intermittent control is performed to improve the fuel efficiency of the engine. In accordance with the intermittent control, the drive-by-motor operation is carried out only when a prescribed executing condition is satisfied. Specifically, the drive-by-motor operation is carried out when the engine temperature is greater than or equal to a permitting temperature (which is, for example, an engine warm-up completion temperature) and prohibited when the engine temperature is less than the permitting temperature.

The drive-by-motor operation in accordance with the intermittent control allows a hybrid vehicle to reduce the fuel consumption of the engine. Accordingly, after the system start-up is initiated in the hybrid vehicle, the fuel efficiency of the engine is further improved as the time becomes longer during which the intermittent control is maintained. The system start-up in the hybrid vehicle herein refers to the state where every device necessary for the vehicle to travel receives power so that the engine can be started and the drive-by-motor can be executed. To initiate the system start-up in the hybrid vehicle when the engine is cold, the engine is started simultaneously with initiation of the system start-up so that the temperature of the engine can rise. Accordingly, to improve the fuel efficiency of the engine, it is preferable to increase the engine temperature to the permitting temperature or higher as early as possible to execute the intermittent control at an early stage after initiation of the system start-up in the hybrid vehicle with the engine cold.

To achieve the goal, the energy generated through operation of the engine at the time when the hybrid vehicle is in operation may be stored in a storage device. If the engine is cold when subsequent system start-up is initiated in the hybrid vehicle, the engine may be heated by a heating device using the energy stored in the storage device. This raises the engine temperature to the permitting temperature or higher at an early stage after initiation of the system start-up, thus executing the intermittent control. As a result, the intermittent control allows the fuel efficiency of the engine to be improved.

As described in Patent Document 1, heat exchange fluid (coolant) circulates in a fluid circuit and passes through an engine to cause heat exchange to cool the engine. Specifically, when the engine is in operation and the coolant is heated, the heated coolant is sent to and stored in a heat storage container via an inlet passage. The engine is thus heated by the thermal energy stored in the heat storage container in the form of the heated coolant. Specifically, the heated coolant in the heat storage container is sent from an outlet passage to the fluid circuit and supplied to the engine through the fluid circuit. This heats the engine and allows the engine temperature to be raised to the permitting temperature or higher. Accordingly, in this case, the heat storage container functions as a storage device for storing thermal energy. The outlet passage and the fluid circuit each function as a heating device for heating the engine using the thermal energy.

In a hybrid vehicle, a motor, together with a generator and an inverter, is mounted in a transaxle. The temperature of the transaxle also influences fuel efficiency of the engine to a great extent. In other words, when the temperature of the transaxle including the motor or the like is low, oil viscosity in a gear portion of the transaxle may become high, thus increasing resistance of the transaxle (the gear portion) to operation of the engine. Also, drive efficiency of the motor may decrease and thus increases resistance of the motor to the operation of the engine. As a result, the fuel efficiency of the engine is deteriorated. To solve this problem, if the engine and the transaxle are cold when the system start-up is initiated in the hybrid vehicle, not only the engine but also the transaxle may be heated by the energy stored in the storage device so as to improve the fuel efficiency of the engine.

However, when the energy stored in the storage device is used to heat the transaxle in addition to the engine, it is likely that the engine temperature cannot reach the permitting temperature even after all of the energy is consumed. In this case, the intermittent control cannot be executed, thus preventing effective improvement of the fuel efficiency of the engine from being achieved through the intermittent control. This problem is highly likely to occur particularly in the case of Patent Document 1, in which the thermal energy generated through the engine operation is stored in the storage device in the form of the heated coolant and the heated coolant is supplied to the engine and the transaxle to heat the engine and the transaxle using the aforementioned thermal energy. Specifically, the problem is brought about by the fact that, in recent hybrid vehicles, engines are reduced in size and exhibit high thermal efficiency, resulting in less heat generation by the engines and a lowered temperature of coolant stored in storage devices.

This problem is generally common in hybrid vehicles that have a battery to store electric energy produced by a generator at the time when an engine is in operation and heats the engine and a transaxle by means of an electrothermal heater using the stored electric energy in subsequent system start-up. In this case, the battery functions as a storage device and the electrothermal heater functions as a heating device.

Patent Document 1: Japanese Laid-Open Patent Publication No. 2007-55299 (Paragraphs [0002] and [0003] and FIG. 1)

SUMMARY OF THE INVENTION

Accordingly, it is an objective of the present invention to provide a control device for a hybrid vehicle that effectively improves fuel efficiency of an internal combustion engine through intermittent control and improves the fuel efficiency of the engine by heating a transaxle to the extent that is possible.

To achieve the foregoing objective, a control device for a hybrid vehicle is provided. The hybrid vehicle has an internal combustion engine and a motor as drive sources, and is capable of performing drive-by-motor operation in which the engine is stopped and only the motor is operated as the drive source. The control device carries out an intermittent control, in which, when an engine temperature is greater than or equal to a permitting temperature, the drive-by-motor operation is performed on condition that a prescribed executing condition is satisfied. The control device prohibits execution of the intermittent control when the engine temperature is less than the permitting temperature. The control device includes a transaxle, a storage device, a heating device, and a control section. The motor, a generator, and an inverter are mounted in the transaxle. The storage device stores energy produced through the operation of the engine after initiation of system start-up in the vehicle. The heating device heats at least one of the engine and the transaxle using the energy stored in the storage device at the time of the initiation of the system start-up in the vehicle. The control section controls the heating device to perform heating on the engine using the energy stored in the storage device when the engine temperature can be raised to the permitting temperature or higher through the heating by the energy at the time of the initiation of the system start-up in the vehicle.

In the above-described configuration, when the engine temperature can be raised to the permitting temperature or higher through heating by energy stored in the storage device at the time of the initiation of the system start-up in the hybrid vehicle, the heating by the energy is carried out on the engine. This increases the engine temperature to the permitting temperature or higher, and thus the intermittent control is executed. By the execution of the intermittent control at an early stage after the initiation of the system start-up in the hybrid vehicle in this manner, the fuel efficiency of the engine is effectively improved through the intermittent control. When the engine temperature cannot be raised to the permitting temperature or higher through the heating by the energy stored in the storage device at the time of the initiation of the system start-up in the hybrid vehicle, the heating by the energy is carried out on the transaxle, thus heating the transaxle. This improves the fuel efficiency of the engine. As a result, the fuel efficiency of the engine is effectively improved through the execution of the intermittent control at the early stage after the initiation of the system start-up in the hybrid vehicle.

In accordance one aspect of the present invention, the control device for a hybrid vehicle further includes a travel prediction determining section for determining a predicted travel time and a predicted travel speed of the hybrid vehicle at the time of the initiation of the system start-up in the hybrid vehicle. When the engine temperature cannot be raised to the permitting temperature or higher through the heating by the energy stored in the storage device, the control section performs the heating by the energy selectively on one of the engine and the transaxle based on the predicted travel time and the predicted travel speed determined by the travel prediction determining section. The control section selects a target of the heating between the engine and the transaxle in such a manner as to improve the fuel efficiency of the engine at the time when the vehicle will have traveled for the predicted travel time and at the predicted travel speed.

When the predicted travel time is short and the predicted travel speed is low, as determined at the time of the initiation of the system start-up in the hybrid vehicle, the fuel efficiency of the engine is further improved by selecting the engine as the target of the heating by the energy stored in the storage device than by selecting the transaxle as the heating target. Specifically, when the predicted travel time is short, the fuel efficiency of the engine is effectively improved by rising the engine temperature as quickly as possible so that the intermittent control is executed and the oil viscosity in the engine can be lowered to reduce the resistance to the operation of the engine. Further, when the predicted travel speed is low, the resistance to the operation of the engine, which is caused by increased oil viscosity in a gear portion of the transaxle due to a low temperature or lowered the drive efficiency of the motor under a low temperature, is decreased. In this circumstance, the fuel efficiency of the engine is effectively improved by heating the engine, as has been described, compared with the case where the transaxle is heated.

In contrast, if the predicted travel time is long and the predicted travel speed is high, as determined at the time of the initiation of the system start-up in the hybrid vehicle, the fuel efficiency of the engine is further improved by selecting the transaxle as the target of the heating by the energy stored in the storage device than by selecting the engine as the heating target. Specifically, when the predicted travel time is long, the engine temperature eventually rises to the permitting temperature as the engine operates, thus the intermittent control is executed. Accordingly, the fuel efficiency of the engine is effectively improved by heating the transaxle and thus reducing the resistance to the operation of the engine. Further, when the predicted travel speed is high, the resistance to the operation of the engine, which is caused by the increased oil viscosity in the gear portion of the transaxle due to the low temperature or the lowered drive efficiency of the motor under the low temperature, is increased. In this circumstance, the fuel efficiency of the engine is effectively improved by heating the transaxle, as has been described, compared with the case where the engine is heated.

As a result, in the above-described configuration, by selecting the target of the heating by the energy stored in the storage device between the engine and the transaxle after the initiation of the system start-up in the hybrid vehicle in such a manner as to effectively improve the fuel efficiency of the engine, the fuel efficiency of the engine is effectively improved.

In accordance with one aspect of the present invention, when the engine temperature cannot be raised to the permitting temperature or higher through the heating by the energy stored in the storage device and the predicted travel time and the predicted travel speed are indeterminable for the travel prediction determining section, the control section performs the heating by the energy on both of the engine and the transaxle.

When the predicted travel time and the predicted travel speed are indeterminable for the travel prediction determining section, selection of the target of the heating by the energy stored in the storage device between the engine and the transaxle cannot be performed in such a manner as to effectively improve the fuel efficiency of the engine. In this case, if the heating by the stored energy is performed on only one of the engine and the transaxle, the transaxle is heated when the predicted travel time is short and the predicted travel speed is low or the engine is heated when the predicted travel time is long and the predicted travel speed is high. This may significantly deteriorate the fuel efficiency of the engine.

In the above-described configuration, when the predicted travel time and the predicted travel speed are indeterminable for the travel prediction determining section, the heating by the aforementioned energy is carried out on both of the engine and the transaxle. This prevents the aforementioned significant deterioration of the fuel efficiency, which may occur in a case where only one of the engine and the transaxle is heated.

In accordance with one aspect of the present invention, the control device for a hybrid vehicle includes a fluid circuit for circulating heat exchanging fluid that flows through the engine to exchange heat with the engine and an air conditioner for heating a passenger compartment using heat of the heat exchanging fluid. The storage device collects and stores, as a thermal energy, the heat exchanging fluid that has been heated in the fluid circuit. By supplying the heated heat exchanging fluid stored in the storage device to at least one of the fluid circuit and the transaxle, the heating device heats the corresponding one(s) of the engine and the transaxle. Even when it is determined that the engine temperature cannot be raised to the permitting temperature or higher through the heating by the thermal energy stored in the storage device, the control section controls the heating device to perform the heating by the thermal energy stored in the storage device on the engine as long as no request for heating the passenger compartment is generated.

If the system start-up has been initiated in the hybrid vehicle with the engine cold and a request for heating the passenger compartment is generated, the air conditioner heats the passenger compartment using the heat generated by the heat exchanging fluid in the fluid circuit. This transmits the heat from the heat exchanging fluid in the fluid circuit, thus preventing a temperature rise in the engine. In other words, if no request for heating passenger compartment is generated and the air conditioner is prevented from heating the passenger compartment using the heat of the heat exchanging fluid in the fluid circuit, the temperature rise in the engine is promoted. That is, even if it is determined that the engine temperature cannot be raised to the permitting temperature or higher through the heating by the thermal energy stored in the storage device, it is highly likely that the engine temperature can be increased to the permitting temperature or higher by supplying the heat exchanging fluid into the fluid circuit. In the above-described configuration, in this circumstance, the heat exchanging fluid stored in the storage device is sent into the fluid circuit, thus executing the intermittent control at an early stage after the initiation of the system start-up in the hybrid vehicle. As a result, the effect of improving the fuel efficiency of the engine through the execution of the intermittent control is ensured in a wider range.

In accordance with one aspect of the present invention, the control device for a hybrid vehicle further includes a travel prediction determining section for determining a predicted travel time and a predicted travel speed of the hybrid vehicle at the time of the initiation of the system start-up in the hybrid vehicle. When it is determined that the engine temperature cannot be raised to the permitting temperature or higher through the heating by the thermal energy stored in the storage device and a request for heating the passenger compartment is generated, the control section performs the heating by the thermal energy selectively on one of the engine and the transaxle based on the predicted travel time and the predicted travel speed determined by the travel prediction determining section. The control section selects a target of the heating between the engine and the transaxle in such a manner as to improve the fuel efficiency of the engine at the time when the vehicle will have traveled for the predicted travel time and at the predicted travel speed.

When the predicted travel time is short and the predicted travel speed is low, as determined at the time of the initiation of the system start-up in the hybrid vehicle, the fuel efficiency of the engine is further improved by selecting the engine as the target of the heating by the thermal energy stored in the storage device than by selecting the transaxle as the target, even though it is determined that the engine temperature cannot be raised to the permitting temperature or higher through the heating by the thermal energy. Specifically, if the schedule travel time is short, the fuel efficiency of the engine is effectively improved by increasing the engine temperature as quickly as possible to execute the intermittent control at an early stage and decrease the oil viscosity in the engine and thus reduce the resistance to the operation of the engine. Further, if the predicted travel speed is low, the resistance to the operation of the engine, which is caused by increased oil viscosity in a gear portion of the transaxle due to a low temperature or lowered drive efficiency of the motor under a low temperature, is decreased. In this circumstance, the fuel efficiency of the engine is effectively improved by heating the engine, as has been described, compared with heating the transaxle.

In contrast, when the predicted travel time is long and the predicted travel speed is high, as determined at the initiation of the system start-up in the hybrid vehicle, the fuel efficiency of the engine is improved by selecting the transaxle as the target of the heating by the thermal energy stored in the storage device than by selecting the engine as the target. Specifically, if the predicted travel time is long, the engine temperature eventually reaches the permitting temperature as the engine operates, thus executing the intermittent control. Accordingly, the fuel efficiency of the engine is effectively improved by heating the transaxle and thus reducing the resistance to the operation of the engine. Further, if the predicted travel speed is high, the resistance to the operation of the engine, which is caused by the increased oil viscosity in the gear portion of the transaxle due to a low temperature or the lowered drive efficiency of the motor under a low temperature, is increased. In this circumstance, the fuel efficiency of the engine is effectively improved by heating the transaxle, compared with heating the engine, as has been described.

As a result, in the above-described configuration, after the initiation of the system start-up in the hybrid vehicle, the fuel efficiency of the engine is effectively improved by selecting the target of the heating by the thermal energy stored in the storage device between the engine and the transaxle in such a manner as to improve the fuel efficiency of the engine.

In accordance with one aspect of the present invention, when it is determined that the engine temperature cannot be raised to the permitting temperature or higher through the heating by the thermal energy stored in the storage device, a request for heating the passenger compartment is generated, and the predicted travel time and the predicted travel speed are indeterminable for the travel prediction determining section, the control section performs the heating by the thermal energy on both of the engine and the transaxle.

When the predicted travel time and the predicted travel speed are indeterminable for the travel prediction determining section, selection of the target of the heating by the thermal energy stored in the storage device between the engine and the transaxle cannot be carried out in such a manner as to improve the fuel efficiency of the engine. In this case, if the heating by the thermal energy is performed on only one of the engine and the transaxle, the transaxle is heated when the predicted travel time is short and the predicted travel speed is low and the engine is heated when the predicted travel time is long and the predicted travel speed is high. This may significantly deteriorate the fuel efficiency of the engine.

In the above-described configuration, if the predicted travel time and the predicted travel speed are indeterminable for the travel prediction determining section, the heating by the thermal energy is carried out on both of the engine and the transaxle. This prevents the aforementioned significant deterioration of the fuel efficiency, which may be caused in a case where the heating is performed on only one of the engine and the transaxle.

In accordance with one aspect of the present invention, the control device for a hybrid vehicle includes a travel prediction determining section for determining a predicted travel time and a predicted travel speed of the hybrid vehicle at the time of the initiation of the system start-up in the hybrid vehicle. The heating device heats at least one of the engine and the transaxle using the energy produced through the operation of the engine after the initiation of the system start-up in the hybrid vehicle. The control section performs the heating by the energy selectively on one of the engine and the transaxle based on the predicted travel time and the predicted travel speed determined by the travel prediction determining section. The control section selects a target of the heating between the engine and the transaxle in such a manner as to improve the fuel efficiency of the engine at the time when the vehicle will have traveled for the predicted travel time and at the predicted travel speed.

When the predicted travel time is short and the predicted travel speed is low, as determined at the time of the initiation of the system start-up in the hybrid vehicle, the fuel efficiency of the engine is further improved by selecting the engine as the target for the heating by the energy produced through the operation of the engine after the initiation of the system start-up than by selecting the transaxle as the target. Specifically, if the schedule travel time is short, the fuel efficiency of the engine is effectively improved by increasing the engine temperature as quickly as possible to execute the intermittent control at an early stage and decrease the oil viscosity in the engine and thus reduce the resistance to the operation of the engine. Further, if the predicted travel speed is low, the resistance to the operation of the engine, which is caused by increased oil viscosity in a gear portion of the transaxle due to a low temperature or lowered drive efficiency of the motor under a low temperature, is decreased. In this circumstance, the fuel efficiency of the engine is effectively improved by heating the engine, as has been described, compared with heating the transaxle.

In contrast, when the predicted travel time is long and the predicted travel speed is high, as determined at the initiation of the system start-up in the hybrid vehicle, the fuel efficiency of the engine is further improved by selecting the transaxle solely or together with the engine as the target(s) of the heating by the energy produced through the operation of the engine after the initiation of the system start-up than by selecting only the engine as the target. Specifically, if the predicted travel time is long, the engine temperature eventually reaches the permitting temperature as the engine operates, thus executing the intermittent control. Accordingly, the fuel efficiency of the engine is effectively improved by heating the transaxle and thus reducing the resistance to the operation of the engine. Further, if the predicted travel speed is high, the resistance to the operation of the engine, which is caused by the increased oil viscosity in the gear portion of the transaxle due to a low temperature or the lowered drive efficiency of the motor under a low temperature, is increased. In this circumstance, the fuel efficiency of the engine is effectively improved by heating the transaxle, compared with heating the engine, as has been described.

As a result, in the above-described configuration, after the initiation of the system start-up in the hybrid vehicle, the fuel efficiency of the engine is effectively improved by selecting the target for the heating by the energy produced through the operation of the engine between the engine and the transaxle in such a manner as to effectively improve the fuel efficiency of the engine.

In accordance with one aspect of the present invention, when the predicted travel time and the predicted travel speed are indeterminable for the travel prediction determining section, the control section performs the heating by the energy on both of the engine and the transaxle.

When the predicted travel time and the predicted travel speed are indeterminable for the travel prediction determining section, selection of the target of the heating by the energy produced through the operation of the engine between the engine and the transaxle cannot be performed in such a manner as to improve the fuel efficiency of the engine. In this case, if the heating by the aforementioned energy is performed on only one of the engine and the transaxle, the transaxle is heated when the predicted travel time is short and the predicted travel speed is low and the engine is heated when the predicted travel time is long and the predicted travel speed is high. This may significantly deteriorate the fuel efficiency of the engine.

In the above-described configuration, if the predicted travel time and the predicted travel speed are indeterminable for the travel prediction determining section, the heating by the aforementioned energy is carried out on both of the engine and the transaxle. This prevents the aforementioned significant deterioration of the fuel efficiency, which may be caused by heating only one of the engine and the transaxle.

DETAILED DESCRIPTION OF THE PREFERRED EMBODIMENTS

First Embodiment

A first embodiment of the present invention employed in a hybrid vehicle having an internal combustion engine and a motor serving as drive sources will now be described with reference to FIGS. 1 to 5.

Figure 1:
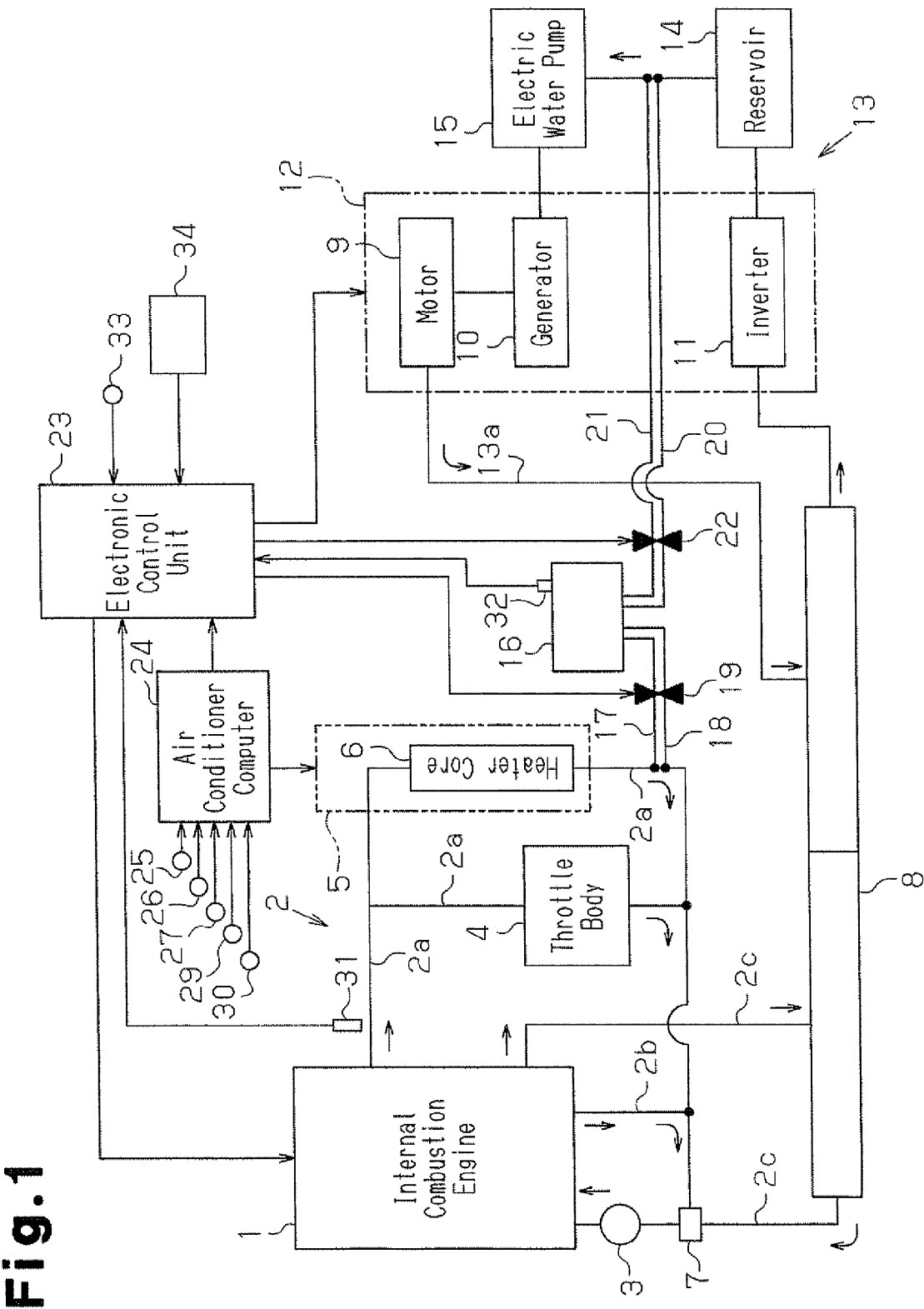
FIG. 1 is a diagram schematically illustrating the configuration of a cooling system in a hybrid vehicle employing a control device according to a first embodiment and the electric configuration of the control device.

As illustrated in FIG. 1, the hybrid vehicle has a fluid circuit 2 extending through an internal combustion engine 1, which is one of the drive sources. The fluid circuit 2 receives coolant serving as heat exchanging fluid, which is circulated through actuation of a water pump 3. This causes heat exchange between the coolant and the engine 1. Through the heat exchange, the engine 1 is cooled when heated. The water pump 3 is driven through transmission of rotational action from the engine 1.

The fluid circuit 2 has a passage 2a branched into two sections, one of which is connected to a throttle body 4 with the other connected to a heater core 6 of an air conditioner 5. After exiting the engine 1, some of the coolant flows to the throttle body 4 and the heater core 6 via the passage 2a and then reaches a thermostat 7. The rest of the coolant is sent to the thermostat 7 through a passage 2b bypassing the throttle body 4 and the heater core 6. A passage 2c is connected to the thermostat 7 to send the coolant to a radiator 8 after the coolant exits the engine 1.

The thermostat 7 prohibits flow of the coolant from the passage 2c to the thermostat 7 when the temperature of the coolant from the passages 2a, 2b is low. When the temperature of the coolant from the passages 2a, 2b increases to a certain value, the thermostat 7 permits flow of the coolant from the passage 2c into the thermostat 7. Accordingly, when the temperature of the coolant passing through the engine 1 is low, the coolant is prevented from flowing through the radiator 8 and being cooled through heat exchange with the atmospheric air in the radiator 8. If the temperature of the coolant is high, the coolant is permitted to pass through the radiator 8 and thus the coolant is cooled through the heat exchange with the atmospheric air in the radiator 8.

The air conditioner 5 of the hybrid vehicle is operated to adjust the temperature of the air in the passenger compartment. The air conditioner 5 uses the heat of the coolant passing through the heater core 6 to heat the passenger compartment. Specifically, the air conditioner 5 introduces the air from the passenger compartment to the heater core 6, thus causing heat exchange between heated coolant and the air in the heater core 6. The temperature of the air is thus increased. The heated air is then sent into the passenger compartment to heat the passenger compartment. As a result, since the air conditioner 5 uses the coolant in the fluid circuit 2 to heat the air in the passenger compartment, the temperature of the coolant drops by the amount corresponding to the heating amount of the air.

In the hybrid vehicle, a motor 9, which is one of the drove sources, is mounted in a transaxle 12, together with electric devices such as a generator 10 and an inverter 11. The transaxle 12 is configured by a transmission and a differential gear. The transaxle 12 receives drive power from the engine 1 and transmits the drive power to wheels. By circulating the coolant, which is the heat exchanging fluid, in the fluid circuit 13 passing through the transaxle 12 through actuation of an electric water pump 15, heat exchange is brought about between the transaxle 12 and the coolant. Through such heat exchange, the transaxle 12 is cooled when heated.

The coolant in the fluid circuit 13 flows through the inverter 11 in the transaxle 12, a reservoir 14, the electric water pump 15, the generator 10 in the transaxle 12, and the motor 9 in the transaxle 12 sequentially in this order. After exiting the motor 9, the coolant is sent to the radiator 8 through a passage 13a, cooled through heat exchange with the atmospheric air in the radiator 8, and then sent to the inverter 11. The radiator 8 is partitioned into a portion connected to the fluid circuit 2 routed through the engine 1 and a portion connected to a fluid circuit 13 routed through the transaxle 12. The coolant in the fluid circuit 2 and the coolant in the fluid circuit 13 are thus prevented from being mixed together in the radiator 8.

The description below is of a configuration for storing energy produced through engine operation after system start-up in the hybrid vehicle and a device for heating components of the vehicle using the stored energy in initiation of subsequent system start-up.

The hybrid vehicle has a heat storage container 16 that is thermally insulated from the exterior and capable of storing heated coolant. The heat storage container 16 collects the coolant heated by the heat generated by the engine 1 from the passage 2a of the fluid circuit 2 routed through the engine 1 through an inlet passage 17 and stores the coolant. The heat storage container 16 sends the stored heated coolant to the fluid circuit 2 (the passage 2a) routed through the engine 1 through an outlet passage 18. A first heat storage control valve 19 is arranged in the inlet passage 17 and the outlet passage 18. The first heat storage control valve 19 selectively opens and closes to correspondingly permit or prohibit communication between the heat storage container 16 and the passage 2a. Also, the heat storage container 16 sends the stored heated coolant into the fluid circuit 13 (the passage 13a) routed through the transaxle 12 through an outlet passage 21. By sending the heated coolant from the heat storage container 16 into the fluid circuit 13, the coolant is moved from the fluid circuit 13 into the heat storage container 16 through an inlet passage 20. A second heat storage control valve 22 is arranged in the inlet passage 20 and the outlet passage 21. The second heat storage control valve 22 selectively opens and closes to correspondingly permit or prohibit communication between the heat storage container 16 and the passage 13a.

As the heated coolant is collected from the fluid circuit 2 routed through the engine 1 and stored in the heat storage container 16, the thermal energy produced through operation of the engine 1 is stored in the heat storage container 16 in the form of the heated coolant. In other words, the heat storage container 16 functions as a storage device for storing energy generated through operation of the engine 1 at the time when the hybrid vehicle is in operation. By sending the heated coolant from the heat storage container 16 to the fluid circuit 2 routed through the engine 1 and the fluid circuit 13 routed through the transaxle 12 through the corresponding outlet passages 18, 21, the engine 1 and the transaxle 12 are heated by the coolant, or, in other words, using the aforementioned thermal energy. As a result, the outlet passages 18, 21, the first and second heat storage control valves 19, 22, and the fluid circuits 2, 13 function as a heating device for heating the engine 1 and the transaxle 12 using the thermal energy stored in the heat storage container 16.

The electrical configuration of the control device for the hybrid vehicle will hereafter be described.

The hybrid vehicle has an electronic control unit 23 (a control section and a travel prediction determining section), which controls operation of the engine 1, operation of the transaxle 12 including the motor 9, the generator 10, and the inverter 11, and operation of the first and second heat storage control valves 19, 22. The hybrid vehicle also includes an air conditioner computer 24 for controlling operation of the air conditioner 5. The electronic control unit 23 and the air conditioner computer 24 are connected to each other to communicate with each other.

The air conditioner computer 24 receives detection signals from various types of sensors including an insulation amount sensor 25 for detecting the insulation amount in the passenger compartment of the hybrid vehicle, an outdoor temperature sensor 26 for detecting the temperature of the air outside the vehicle (the outdoor temperature), and an indoor temperature sensor 27 for detecting the temperature of the air in the passenger compartment (the indoor temperature). The air conditioner computer 24 also receives various types of signals from an air conditioner auto control switch 29 for switching between an air conditioner auto mode for automatically adjusting the temperature in the passenger compartment and an air conditioner manual mode for manually adjusting this temperature and a temperature setting switch 30 for switching the set temperature for the passenger compartment.

When the air conditioner auto control switch 29 is at the manipulation position "MANUAL", the air conditioner computer 24 operates in accordance with the air conditioner manual mode to adjust the temperature in the passenger compartment. Specifically, the air conditioner computer 24 controls the air conditioner 5 in such a manner that the temperature in the passenger compartment becomes the value corresponding to the manipulation position of the temperature setting switch 30, which is manipulated by an occupant of the vehicle. In contrast, when the air conditioner auto control switch 29 is at the manipulation position "AUTO", the air conditioner computer 24 operates in accordance with the air conditioner auto mode to adjust the temperature in the passenger compartment. Specifically, the air conditioner computer 24 controls the air conditioner 5 in correspondence with the set temperature set by the manipulation position of the temperature setting switch 30, the indoor temperature, the insulation amount, the outdoor temperature, and the temperature of the coolant in the fluid circuit 2.

If a request for heating the passenger compartment is generated when the temperature in the passenger compartment is adjusted through control of the air conditioner 5, the air conditioner 5 heats the passenger compartment using the heat of the coolant in the fluid circuit 2 routed through the engine 1, as has been described. Accordingly, when the passenger compartment is heated by the air conditioner in response to the request for heating the passenger compartment, the heat is transmitted from the coolant in the fluid circuit 2 routed through the engine 1 and the temperature of the coolant drops. This prevents a temperature rise in the engine 1, which exchanges heat with the coolant.

The electronic control unit 23 receives detection signals from a coolant temperature sensor 31 for detecting the temperature of the coolant in the fluid circuit 2 routed through the engine 1 and a coolant temperature sensor 32 for detecting the temperature of the coolant in the heat storage container 16. The electronic control unit 23 also receives signals from a start-up switch 33 for starting up the hybrid vehicle and travel information including a present location, a destination, and a travel route from a navigation system 34 mounted in the hybrid vehicle.

The electronic control unit 23 carries out intermittent control for improving the fuel efficiency of the engine 1 through drive-by-motor motor operation in which the engine 1 is stopped and the motor 9 is operated solely. In accordance with the intermittent control, the drive-by-motor operation is performed only if a prescribed executing condition is satisfied. The intermittent control is executed when the engine temperature is greater than or equal to a permitting temperature and prohibited when the engine temperature is less than the permitting temperature. The temperature of the coolant in the fluid circuit 2 routed through the engine 1 may be used as the engine temperature. By maximally prolonging the time for maintaining the intermittent control after initiation of system start-up in the hybrid vehicle, the fuel efficiency of the engine 1 is improved in the hybrid vehicle. Accordingly, in order to improve the fuel efficiency of the engine 1, it is preferable to raise the temperature of the engine 1 to the permitting temperature or higher as early as possible to execute the intermittent control at an early stage after the initiation of the system start-up in the hybrid vehicle with the engine 1 cold.

If the engine 1 is cold when the system start-up of the hybrid vehicle is initiated, the engine 1 may be heated by the coolant in the heat storage container 16, which is the thermal energy that has been produced through operation of the engine 1 in the previous operation of the hybrid vehicle and stored in the form of the heated coolant. Specifically, the first heat storage control valve 19 is opened to connect the heat storage container 16 and the fluid circuit 2 (the passage 2a) routed through the engine 1. This sends the heated coolant from the heat storage container 16 to the fluid circuit 2 through the outlet passage 18. Meanwhile, the coolant in the fluid circuit 2 is sent to the heat storage container 16 through the inlet passage 17. After entering the fluid circuit 2, the heated coolant from the heat storage container 16 flows into the engine 1 through the fluid circuit 2 and heats the engine 1. In this case, the engine 1 is heated by the heated coolant stored in the heat storage container 16 even if the system start-up has been initiated in the hybrid vehicle with the engine 1 cold. As a result, the engine temperature quickly rises to the permitting temperature or higher to execute the intermittent control at an early stage after the initiation of the system start-up. The fuel efficiency of the engine 1 is thus improved through the execution of the intermittent control.

As has been described, in the hybrid vehicle, the temperature of the transaxle 12 also influences the fuel efficiency of the engine 1 to a great extent. Specifically, when the temperature of the transaxle 12 including the motor 9 is low, oil viscosity in a gear portion of the transaxle 12 rises and increases resistance of the transaxle 12 to operation of the engine 1. Also, the drive efficiency of the motor 9 decreases and increases resistance of the motor 9 to the operation of the engine 1. The fuel efficiency of the engine 1 is thus deteriorated. Accordingly, if the engine 1 and the transaxle 12 are cold when the system start-up is initiated in the hybrid vehicle, not only the engine 1 but also the transaxle 12 may be heated by the heated coolant stored in the heat storage container 16 in order to improve the fuel efficiency of the engine 1.

However, if the heated coolant stored in the heat storage container 16 heats both of the engine 1 and the transaxle 12, it is likely that the engine temperature cannot reach the permitting temperature even by using all of the coolant. In this case, the intermittent control cannot be carried out, and the fuel efficiency of the engine 1 cannot be improved through the intermittent control cannot. Particularly, in recent hybrid vehicles, the engine 1 is reduced in size and exhibits improved thermal efficiency, resulting in less heat generation by the engine 1. This lowers the temperature of the coolant stored in the heat storage container 16, thus increasing the likeliness that the above-described problem occurs.

The solution to the problem will hereafter be described with reference to the flowchart of FIG. 2, which represents a start-up heating routine for heating the engine 1 and the transaxle 12 using heated coolant stored in the heat storage container 16 when system start-up is performed in the hybrid vehicle. The start-up heating routine is performed through the electronic control unit 23 when the system start-up is initiated in the hybrid vehicle.

According to the routine, it is first determined whether the amount of the heat stored in the heat storage container 16 is less than a determination value MJ (S101). The amount of the heat stored in the heat storage container 16 is determined based on the temperature of the coolant in the heat storage container 16 and the capacity of the heat storage container 16. The determination value MJ is the lower limit of such amounts of the aforementioned stored heat that allow the engine temperature to rise to the permitting temperature or higher through heating of the engine 1 using the heated coolant stored in the heat storage container 16. The determination value MJ is set variably in correspondence with, for example, the coolant temperature in the fluid circuit 2, which corresponds to the engine temperature, in such a manner that the determination value MJ becomes greater as the coolant temperature at the time of initiation of the system start-up becomes lower.

If the determination is negative in step 101, it is indicated that the engine temperature can be increased to the permitting temperature or higher through heating using the thermal energy stored in the heat storage container 16, or, more specifically, the amount of the aforementioned thermal energy is greater than or equal to such a value that can increase the engine temperature to the permitting temperature or higher through heating of the engine 1 using the thermal energy. In this case, to allow the heating using the thermal energy stored in the heat storage container 16 only on the engine 1, the heated coolant stored in the heat storage container 16 is sent only to the fluid circuit 2 routed through the engine 1 (S106). Specifically, the second heat storage control valve 22 is closed to prohibit communication between the heat storage container 16 and the fluid circuit 13 routed through the transaxle 12. Meanwhile, the first heat storage control valve 19 is opened to permit communication between the heat storage container 16 and the fluid circuit 2 routed through the engine 1. This sends the heated coolant in the heat storage container 16 to the fluid circuit 2 (the passage 2a) routed through the engine 1 through the outlet passage 18 and the coolant in the passage 2a to the heat storage container 16 through the inlet passage 17. The heated coolant from the heat storage container 16, which has been sent into the fluid circuit 2, flows to the engine 1 through the fluid circuit 2 and heats the engine 1.

As a result, the engine temperature (the coolant temperature in the fluid circuit 2) rises to the permitting temperature or higher and the intermittent control is performed early after initiation of the system start-up in the hybrid vehicle. The fuel efficiency of the engine 1 is thus improved through execution of the intermittent control.

Figure 3:
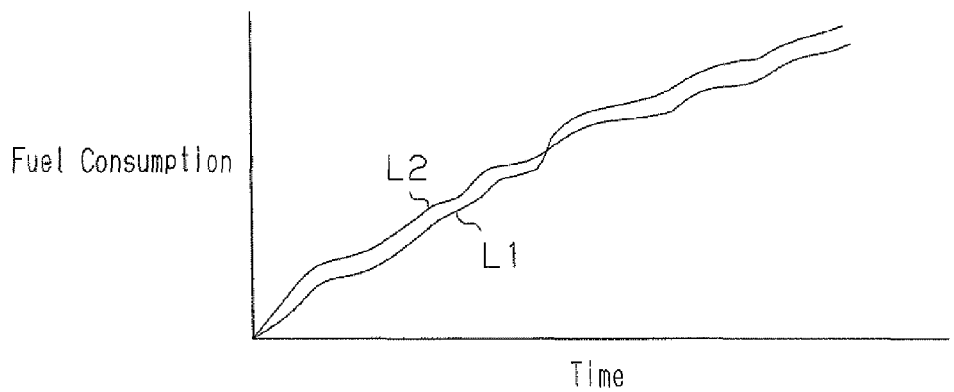
FIG. 3 is a timing chart representing changes of the fuel consumption amount of an internal combustion engine as the time elapses in a case where the engine is heated and in a case where the transaxle is heated when the system start-up is initiated in the hybrid vehicle.

FIG. 3 is a graph representing change of fuel consumption of the engine 1 as the time elapses after the start-up is initiated in the hybrid vehicle in a case where a prescribed amount of heated coolant is supplied to the fluid circuit 2 routed through the engine 1 and in a case where the heated coolant is supplied to the fluid circuit 13 routed through the transaxle 12. In the graph, the solid line L1 represents the change of the fuel consumption of the engine 1 as the time elapses in the case where the heated coolant is sent to the fluid circuit 2 routed through the engine 1. The solid line L2 represents the change of the fuel consumption of the engine 1 as the time elapses in the case where the heated coolant is sent to the fluid circuit 2 routed through the transaxle 12.

Figure 4:
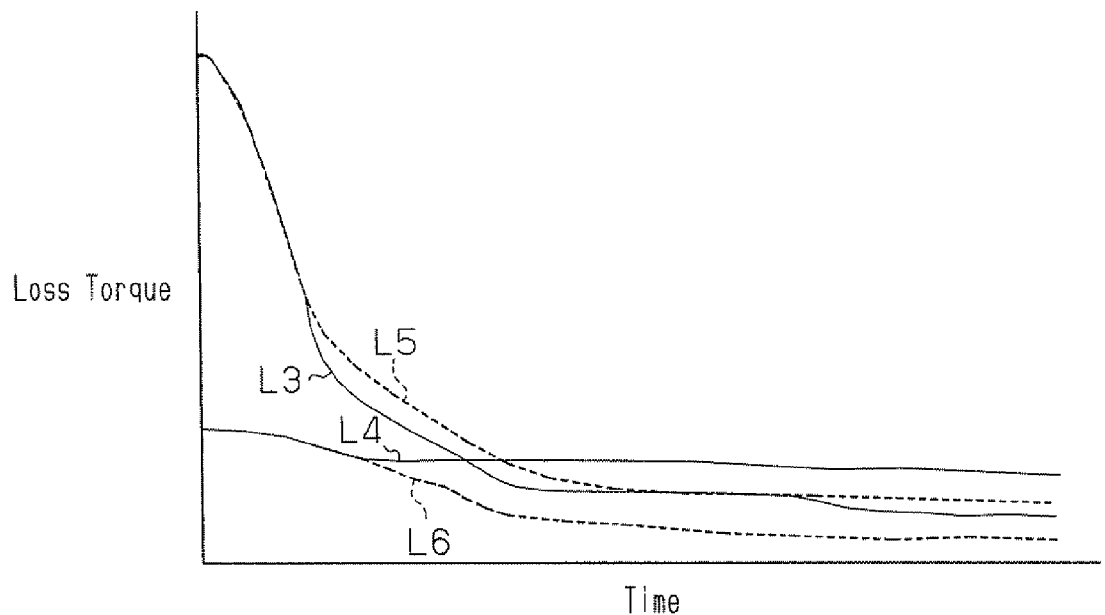
FIG. 4 is a timing chart representing changes of loss torque as the time elapses in the case where the engine is heated and the case where the transaxle is heated when the system start-up is initiated in the hybrid vehicle.

FIG. 4 is a graph representing changes of loss torque (which corresponds to resistance to engine operation) of the engine 1 as the time elapses after the system start-up is initiated in the hybrid vehicle in a case where a prescribed amount of heated coolant is supplied to the fluid circuit 2 routed through the engine 1 and in a case where the heated coolant is supplied to the fluid circuit 13 routed through the transaxle 12. In the graph, the solid line L3 represents change of the loss torque caused by the resistance of the engine 1 to the operation of the engine 1 as the time elapses in the case where the heated coolant is supplied to the fluid circuit 2 routed through the engine 1. The solid line L4 represents change of the loss torque caused by the resistance of the transaxle 12 to the operation of the engine 1 as the time elapses in the case where the heated coolant is sent to the fluid circuit 2. The broken line L5 represents change of the loss torque caused by the resistance of the engine 1 to the operation of the engine 1 as the time elapses in the case where the heated coolant is supplied to the fluid circuit 2 routed through the transaxle 12. The broken line L6 represents change of the loss torque caused by the resistance of the transaxle 12 to the operation of the engine 1 as the time elapses in the case where the heated coolant is sent to the fluid circuit 13.

By supplying the heated coolant to the fluid circuit 2 routed through the engine 1 to heat the engine 1 (as in the cases represented by the solid line L1 in FIG. 3 and the solid lines L3 and L4 in FIG. 4), the engine temperature is increased to the permitting temperature and the intermittent control is performed at an early stage after the system start-up is initiated in the hybrid vehicle. Such heating of the engine 1 also raises the temperature of the oil in the engine 1 rapidly. This quickly decreases the viscosity of the oil, thus reducing the resistance to the operation of the engine 1. As a result of the temperature rises in the engine and the engine oil, the fuel efficiency of the engine 1 is improved.

When the heated coolant is sent to the fluid circuit 13 routed through the transaxle 12 to heat the transaxle 12 (as in the cases represented by the solid line L2 in FIG. 3 and the broken lines L5 and L6 in FIG. 4), the temperature of lubricant oil for the gear portion of the transaxle 12 quickly rises, thus rapidly lowering the viscosity of the lubricant oil, at an early stage after the system start-up is initiated in the hybrid vehicle. This decreases the driving resistance of the gear portion of the transaxle 12 to the operation of the engine 1. The heated coolant supplied to the fluid circuit 13 routed through the transaxle 12 also heats the motor 9, which is mounted in the transaxle 12. This prevents decrease in the drive efficiency of the motor 9 caused by a low temperature, and the resistance of the motor 9 to the operation of the engine 1 is maintained without increasing. As a result of the temperature rises in the lubricant oil and the motor 9, the fuel efficiency of the engine 1 is improved.

As is clear from FIG. 3, in a short period following initiation of the system start-up in the hybrid vehicle, the fuel consumption of the engine 1 is low in the case (corresponding to the solid line L1) where the heated coolant is sent to the fluid circuit 2 routed through the engine 1, by comparison with the case (corresponding to the solid line L2) where the heated coolant is supplied to the fluid circuit 13 routed through the transaxle 12. Specifically, in this period, early execution of the intermittent control and decreased resistance to the operation of the engine 1, which are brought about by the heated engine 1, are effective compared with reduced driving resistance of the gear portion and the motor 9 in the transaxle 12 to the operation of the engine 1, which is caused by the heated transaxle 12, in terms of improvement of fuel efficiency of the engine 1.

Contrastingly, in a period after a certain length of time has elapsed since the initiation of the system start-up in the hybrid vehicle, the fuel consumption of the engine 1 is lower in the case (corresponding to the solid line L2) where the heated coolant is sent to the fluid circuit 13 corresponding to the transaxle 12, than in the case where the heated coolant is supplied to the fluid circuit 13 routed through the engine 1. Specifically, in this period, the decreased resistance of the gear portion and the motor 9 in the transaxle 12 to the operation of the engine 1, which is brought about by the heated transaxle 12, is effective compared with the early execution of the intermittent control and the reduced resistance to the operation of the engine 1, which are caused by the heated engine 1, in terms of the improvement of the fuel efficiency of the engine 1.

In a period immediately after the initiation of the system start-up in the hybrid vehicle, it is unclear whether the travel time of the vehicle will be actually long enough to allow heating of the heated transaxle 12 to effectively improve the fuel efficiency of the engine 1. Accordingly, as long as the engine temperature can be increased to the permitting temperature or higher by heating the engine 1 with the heated coolant stored in the heat storage container 16 after the initiation of the system start-up so that the intermittent control can be carried out, the effect of improving the fuel efficiency of the engine 1 is reliably obtained by heating the engine 1, not the transaxle 12, using the heated coolant. As a result, by heating the engine 1 using the heated coolant stored in the heat storage container 16 in accordance with steps S101 and S106 of the start-up heating routine (FIG. 2), the fuel efficiency of the engine 1 is effectively improved.

When the determination in step S101 of the start-up heating routine is positive, indicating that the amount of the heat stored in the heat storage container 16 is less than the determination value MJ, or, in other words, when it is impossible to raise the engine temperature to the permitting temperature or higher through heating by the thermal energy stored in the heat storage container 16, it is determined whether a request for heating the passenger compartment is generated (S102).

If a request for heating the passenger compartment is generated, the air conditioner 5 heats the passenger compartment using the heat of the coolant in the fluid circuit 2 routed through the engine 1, or, specifically, the coolant flowing through the heater core 6. In this manner, the heat transmits from the coolant in the fluid circuit 2, thus slowing down the rise of the engine temperature. In other words, if no request for heating the passenger compartment is generated and the air conditioner 5 is prevented from heating the passenger compartment using the heat of the coolant in the fluid circuit 2, the rise of the engine temperature is promoted. In this case, even when the amount of the heat stored in the heat storage container 16 is less than the determination value MJ, it is highly likely that the engine temperature can be raised to the permitting temperature or higher by supplying the heated coolant from the heat storage container 16 to the engine 1.

Accordingly, when the determination is negative in step S102, indicating that no request for heating the passenger compartment is generated, the procedure of step S106 is carried out. That is, despite the fact that the amount of the heat stored in the heat storage container 16 is less than the determination value MJ, the engine 1 is heated by the heated coolant in the heat storage container 16. In this manner, the engine 1 performs the intermittent control at an early stage after the initiation of the system start-up in the hybrid vehicle. As a result, the effect of improving the fuel efficiency of the engine 1 through execution of the intermittent control is ensured in a wider range.

In contrast, when the determination is positive in step S102, indicating that a request for heating the passenger compartment is generated, a heating target for the heated coolant in the heat storage container 16 is selected between the engine 1 and the transaxle 12 based on the predicted travel time and the predicted travel speed of the hybrid vehicle and the procedure (S103 to S107) for heating the heating target is carried out.

In the procedure, it is determined whether the predicted travel time and the predicted travel speed of the hybrid vehicle are determinable (S103). The predicted travel time and the predicted travel speed are determined using the travel information including the present location, the destination, and the travel route, which is provided through, for example, the navigation system 34. Accordingly, if the destination and the travel route have been set by an occupant through the navigation system 34, the predicted travel time and the predicted travel speed are determinable using the travel information. In this case, positive determination is made in step S103.

Figure 5:
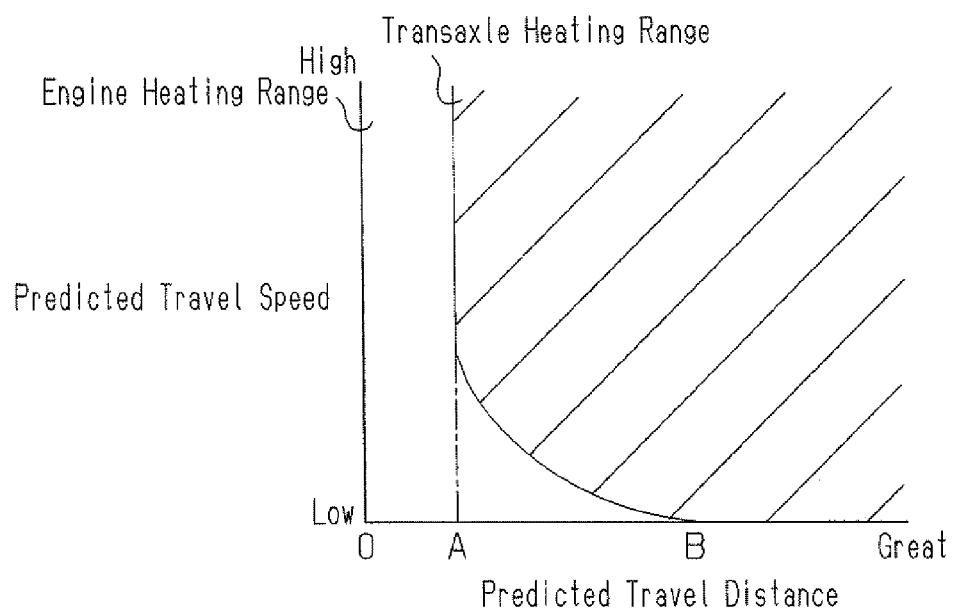
FIG. 5 is a scheme representing a transaxle heating range and an engine heating range each defined based on a predicted travel time and a predicted vehicle speed.

When it is determined that the predicted travel time and the predicted travel speed are determinable in step S103, it is determined whether the predicted travel time and the predicted travel speed fall in the transaxle heating range represented in FIG. 5, based on the predicted travel time and the predicted travel speed determined using the travel information including the present location, the destination, and the travel route (S104). If positive determination is made in this step, the heated coolant stored in the heat storage container 16 is supplied only to the fluid circuit 13 routed through the transaxle 12 so that only the transaxle 12 is heated by the thermal energy stored in the heat storage container 16 (S105). Specifically, the first heat storage control valve 19 is closed to prohibit the communication between the heat storage container 16 and the fluid circuit 2 routed through the engine 1. Meanwhile, the second heat storage control valve 22 is opened to permit the communication between the heat storage container 16 and the fluid circuit 13 routed through the transaxle 12. This sends the heated coolant from the heat storage container 16 to the fluid circuit 13 (the passage 13a) routed through the transaxle 12 via the outlet passage 21, thus moving the coolant in the passage 13a into the heat storage container 16 through the inlet passage 20. The heated coolant sent from the heat storage container 16 to the fluid circuit 13 flows to the transaxle 12 through the fluid circuit 13 to heat the gear portion and the motor 9 in the transaxle 12.

If a negative determination is made in step S104, and the predicted travel time and the predicted travel speed are in the engine heating range represented in FIG. 5, the heated coolant stored in the heat storage container 16 is sent only to the fluid circuit 2 routed through the engine 1 so that only the engine 1 is heated by the thermal energy stored in the heat storage container 16 (S106).

In other words, the procedure of step S104 is carried out to select the heating target for the thermal energy stored in the heat storage container 16 between the engine 1 and the transaxle 12 based on the predicted travel time and the predicted travel speed. The heating target is selected in such a manner as to effectively improve the fuel efficiency of the engine 1 at the time when the hybrid vehicle travels for the predicted travel time and at the predicted travel speed. In other words, the engine heating range, the transaxle heating range, and the boundary between the engine heating range and the transaxle heating range represented in FIG. 5 are defined in such a manner that the heating target is selected between the engine 1 and the transaxle 12 to effectively improve the fuel efficiency of the engine 1. As a result, the fuel efficiency of the engine 1 is effectively improved by selecting the heating target for the thermal energy stored in the heat storage container 16 between the engine 1 and the transaxle 12 in the above-described manner based on the predicted travel time and the predicted travel speed.

With reference to FIG. 5, the heating by the thermal energy stored in the heat storage container 16 on the engine 1 and the transaxle 12 is carried out in the manners described below in the case [1] where the predicted travel distance is less than a predetermined value A, the case [2] where the predicted travel distance is greater than or equal to the value A and less than a predetermined value B, and the case [3] where the predicted travel distance is greater than or equal to the value B.

[1] The heating by the thermal energy stored in the heat storage container 16 is carried out only on the engine 1 regardless of the predicted travel speed.

[2] When the predicted travel distance is short and the predicted travel speed is low, the heating by the thermal energy stored in the heat storage container 16 is performed only on the engine 1. When the predicted travel distance is long and the predicted travel speed is high, the heating is carried out only on the transaxle 12.

Alternatively, in this case, the heating may be performed only on the engine 1 if the product of the predicted travel distance and the predicted travel speed is less than a predetermined threshold value. When the product is greater than or equal to the threshold value, the heating is carried out only on the transaxle 12. Specifically, a fixed value obtained in advance through a test or the like or a variable value variably set to an optimal value in correspondence with the engine temperature or the like at the time of initiation of the system start-up in the hybrid vehicle may be used as the threshold value.

[3] The heating by the thermal energy stored in the heat storage container 16 is performed only on the transaxle 12 regardless of the predicted vehicle speed.

When the predicted travel time is short in the case [2], the fuel efficiency of the engine 1 is effectively improved by raising the engine temperature as quickly as possible to execute the intermittent control and decreasing the viscosity of the oil in the engine 1 to reduce the resistance to the operation of the engine 1 at an early stage after initiation of the system start-up in the hybrid vehicle. In the case [2], when the predicted travel speed is low, the resistance to the operation of the engine 1, which is caused by increased oil viscosity under a low temperature in the gear portion of the transaxle 12 or lowered drive efficiency of the motor 9 under a low temperature, is decreased. In this circumstance, to heat the engine 1 in the above-described manner improves the fuel efficiency of the engine 1 more effectively than to heat the transaxle 12. As a result, when the predicted travel time is short and the predicted travel speed is low, the fuel efficiency of the engine 1 is further improved by heating only the engine 1 by the thermal energy stored in the heat storage container 16, than by heating only the transaxle 12.

When the predicted travel time is long in the case [2], the engine temperature eventually rises to the permitting temperature as the engine 1 operates and thus the execution of the intermittent control is executed. Accordingly, the fuel efficiency of the engine 1 is improved effectively by heating the transaxle 12 to reduce the resistance to the operation of the engine 1. In the case [2], when the predicted travel speed is high, the resistance to the operation of the engine 1, which is caused by increased oil viscosity under a low temperature in the gear portion of the transaxle 12 or lowered drive efficiency of the motor 9 under a low temperature, is increased. In this circumstance, the fuel efficiency of the engine 1 is improved more effectively by heating the transaxle 12 than heating the engine 1 in the above-described manner. As a result, when the predicted travel time is long and the predicted travel speed is high, the fuel efficiency of the engine 1 is further improved by heating only the transaxle 12 by the thermal energy stored in the heat storage container 16 than by heating only the engine 1.

Even when the amount of the heat stored in the heat storage container 16 is less than the determination value MJ after the initiation of the system start-up in the hybrid vehicle, the fuel efficiency of the engine 1 is improved effectively by selecting the heating target for the thermal energy stored in the heat storage container 16 between the engine 1 and the transaxle 12 in the above-described manner.

Figure 2:
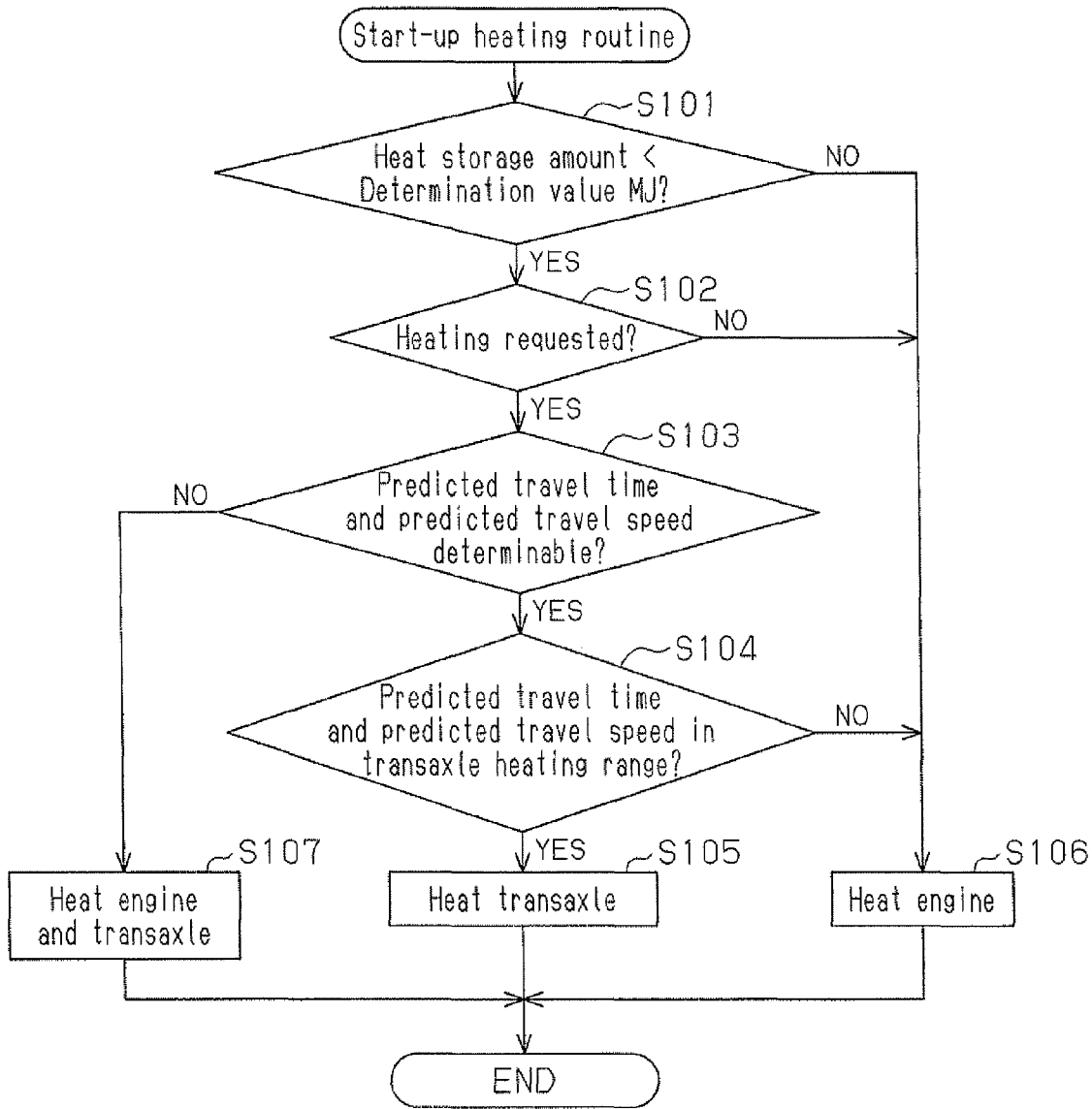
FIG. 2 is a flowchart representing a heating procedure performed when system start-up is initiated in the hybrid vehicle.

If the destination or the travel route has not been set by an occupant through the navigation system 34, or, in other words, if the travel information including the destination and the travel route has not been input through the navigation system 34, it is determined that the predicted travel time and the predicted travel speed are indeterminable in step S103 of the start-up heating routine (FIG. 2).

In this case, to heat both of the engine 1 and the transaxle 12 by the thermal energy stored in the heat storage container 16, the heated coolant stored in the heat storage container 16 is supplied to both of the fluid circuit 2 routed through the engine 1 and the fluid circuit 13 routed through the transaxle 12 (S107). Specifically, the first heat storage control valve 19 and the second heat storage control valve 22 are both opened to permit the communication between the heat storage container 16 and the fluid circuit 2 routed through the engine 1 and the communication between the heat storage container 16 and the fluid circuit 13 routed through the transaxle 12. This sends the heated coolant from the heat storage container 16 to the fluid circuit 2 (the passage 2a) routed through the engine 1 and the fluid circuit 13 (13a) routed through the transaxle 12 through the corresponding outlet passages 18, 21. Correspondingly, the coolant in the passages 2a, 13a flows to the heat storage container 16 through the corresponding inlet passages 17, 20. The heated coolant that has been sent from the heat storage container 16 to the fluid circuits 2, 13 flows to the engine 1 and the transaxle 12 through the corresponding fluid circuits 2, 13 to heat the engine 1 and the transaxle 12.

If the predicted travel time and the predicted travel speed of the hybrid vehicle are indeterminable, selection of the heating target for the thermal energy stored in the heat storage container 16 cannot be performed in such a manner as to effectively improve the fuel efficiency of the engine 1. In this case, if the heating by the aforementioned thermal energy is carried out on only one of the engine 1 and the transaxle 12, the transaxle 12 is heated when the predicted travel time is short and the predicted travel speed is low and the engine 1 is heated when the predicted travel time is long and the predicted travel speed is high. This may significantly deteriorate the fuel efficiency of the engine 1. However, as long as the predicted travel time and the predicted travel speed are indeterminable, the heating by the thermal energy is performed on both of the engine 1 and the transaxle 12, as has been described. This prevents the aforementioned significant deterioration of the fuel efficiency, which may be caused in the cases where the heating is carried out on only one of the engine 1 and the transaxle 12.

The first embodiment, which has been described in detail, has the advantages described below.

(1) When the system start-up is initiated in the hybrid vehicle, it is determined whether the amount of the heat stored in the heat storage container 16 is less than the determination value MJ. If the determination is negative, it is indicated that the engine temperature can rise to the permitting temperature or higher through heating by the thermal energy stored in the heat storage container 16, or, in other words, if the amount of the thermal energy stored in the heat storage container 16 is greater than or equal to such a value that can increase the engine temperature to the permitting temperature for the execution of the intermittent control or higher by heating the engine 1 using the thermal energy. In this case, to heat only the engine 1 by the thermal energy stored in the heat storage container 16, the heated coolant stored in the heat storage container 16 is supplied only to the fluid circuit 2 routed through the engine 1. The heated coolant, which has been sent from the heat storage container 16 to the fluid circuit 2, flows to the engine 1 through the fluid circuit 2 to heat the engine 1. In this manner, the engine temperature is increased to the permitting temperature or higher to execute the intermittent control at an early stage after initiation of the system start-up in the hybrid vehicle and the oil viscosity in the engine 1 rapidly decreases to reduce the resistance to the operation of the engine 1. As a result, the fuel efficiency of the engine 1 is improved.

If the amount of the heat stored in the heat storage container 16 is less than the determination value MJ when the system start-up is initiated in the hybrid vehicle, the transaxle 12 is heated using the thermal energy stored in the heat storage container 16 on condition that a prescribed condition is met. Specifically, the condition is satisfied when a request for heating the passenger compartment is generated and the predicted travel time and the predicted travel speed fall in the transaxle heating range represented in FIG. 5. Alternatively, the condition may be met when a request for heating the passenger compartment is generated and the predicted travel time and the predicted travel speed are indeterminable. By heating the transaxle 12 including the motor 9 and the gear portion using the thermal energy stored in the heat storage container 16 when the condition is satisfied, the oil viscosity in the gear portion of the transaxle 12 rapidly drops at an early stage after the initiation of the system start-up in the hybrid vehicle, thus reducing the resistance of the gear portion to the operation of the engine 1. Further, by heating the motor 9 in the transaxle 12, the resistance of the motor 9 to the operation of the engine 1 is prevented from being increased by decreased drive efficiency of the motor 9 under a low temperature. As has been described, by performing the heating by the thermal energy stored in the heat storage container 16 on the transaxle 12, the fuel efficiency of the engine 1 is improved even if the amount of the heat stored in the heat storage container 16 is less than the determination value MJ when the system start-up is initiated in the hybrid vehicle.

As has been described, the fuel efficiency of the engine 1 is effectively improved through the intermittent control at an early stage after the initiation of the system start-up in the hybrid vehicle. The engine fuel efficiency is improved also by heating the transaxle 12 to the utmost extent.

(2) If the amount of the heat stored in the heat storage container 16 is less than the determination value MJ when the system start-up is initiated in the hybrid vehicle, heating by the thermal energy stored in the heat storage container 16 is performed only on the engine 1 as long as a request for heating the passenger compartment is not generated. Specifically, when a request for heating the passenger compartment is not generated and thus the air conditioner 5 is prevented from heating the passenger compartment using the heat of the coolant in the fluid circuit 2 routed through the engine 1, the heat is prevented from being transmitted from the coolant in order to heat the passenger compartment. In this circumstance, even if the amount of the heat stored in the heat storage container 16 is less than the determination value MJ, it is highly likely that the engine temperature can be increased to the permitting temperature for execution of the intermittent control or higher by heating the engine 1 using the thermal energy stored in the heat storage container 16. Accordingly, even when the amount of the heat stored in the heat storage container 16 is less than the determination value MJ, heating by the thermal energy stored in the heat storage container 16 is carried out only on the engine 1 as long as no request for heating the passenger compartment is generated. This ensures execution of the intermittent control in the engine 1 at an early stage after initiation of the system start-up in the hybrid vehicle. As a result, the effect of improving the fuel efficiency of the engine 1 through the intermittent control is ensured in a wider range.

(3) If the amount of the heat stored in the heat storage container 16 is less than the determination value MJ and a request for heating the passenger compartment is generated when the system start-up is initiated in the hybrid vehicle, the heating target for the thermal energy stored in the heat storage container 16 is selected between the engine 1 and the transaxle 12 based on the predicted travel distance and the predicted travel speed of the hybrid vehicle. Such selection of the heating target is carried out in such a manner as to effectively improve the fuel efficiency of the engine 1 at the time when the vehicle travels for the predicted travel time and at the predicted travel speed. Specifically, when the predicted travel time and the predicted travel speed are in the transaxle heating range represented in FIG. 5, the transaxle 12 is selected as the heating target for the thermal energy stored in the heat storage container 16. When the predicted travel time and the predicted travel speed are in the engine heating range represented in FIG. 5, the engine 1 is selected as the heating target. By selecting the heating target between the engine 1 and the transaxle 12 based on the predicted travel distance and the predicted travel speed in the above-described manner, the fuel efficiency of the engine 1 is effectively improved.

(4) If the amount of the heat stored in the heat storage container 16 is less than the determination value NJ and a request for heating the passenger compartment is generated when the system start-up is initiated in the hybrid vehicle, heating by the thermal energy stored in the heat storage container 16 is carried out on both of the engine 1 and the transaxle 12 on condition that the predicted travel distance and the predicted travel speed are indeterminable. Specifically, when the predicted travel time and the predicted travel speed are indeterminable, selection of the aforementioned heating target for the thermal energy between the engine 1 and the transaxle 12 cannot be performed in such a manner as to effectively improve the fuel efficiency of the engine 1. In this case, if heating by the thermal energy is performed on only one of the engine 1 and the transaxle 12, it is likely that the heating target is selected inappropriately between the engine 1 and the transaxle 12, thus significantly deteriorating the fuel efficiency of the engine 1. However, by performing the heating by the thermal energy on both of the engine 1 and the transaxle 12 when the predicted travel time and the predicted travel speed are indeterminable, the aforementioned significant deterioration of the fuel efficiency, which may be caused in the cases where the heating is carried out on only one of the engine 1 and the transaxle 12, is prevented from happening.

Second Embodiment

A second embodiment of the present invention will hereafter be described with reference to FIGS. 6 and 7.

In the second embodiment, electric energy produced through actuation of the generator 10 driven by the engine 1 is stored as energy generated through operation of the engine 1. Using the stored electric energy, the engine 1 and the transaxle 12 are heated at subsequent system start-up of the hybrid vehicle.

Figure 6:
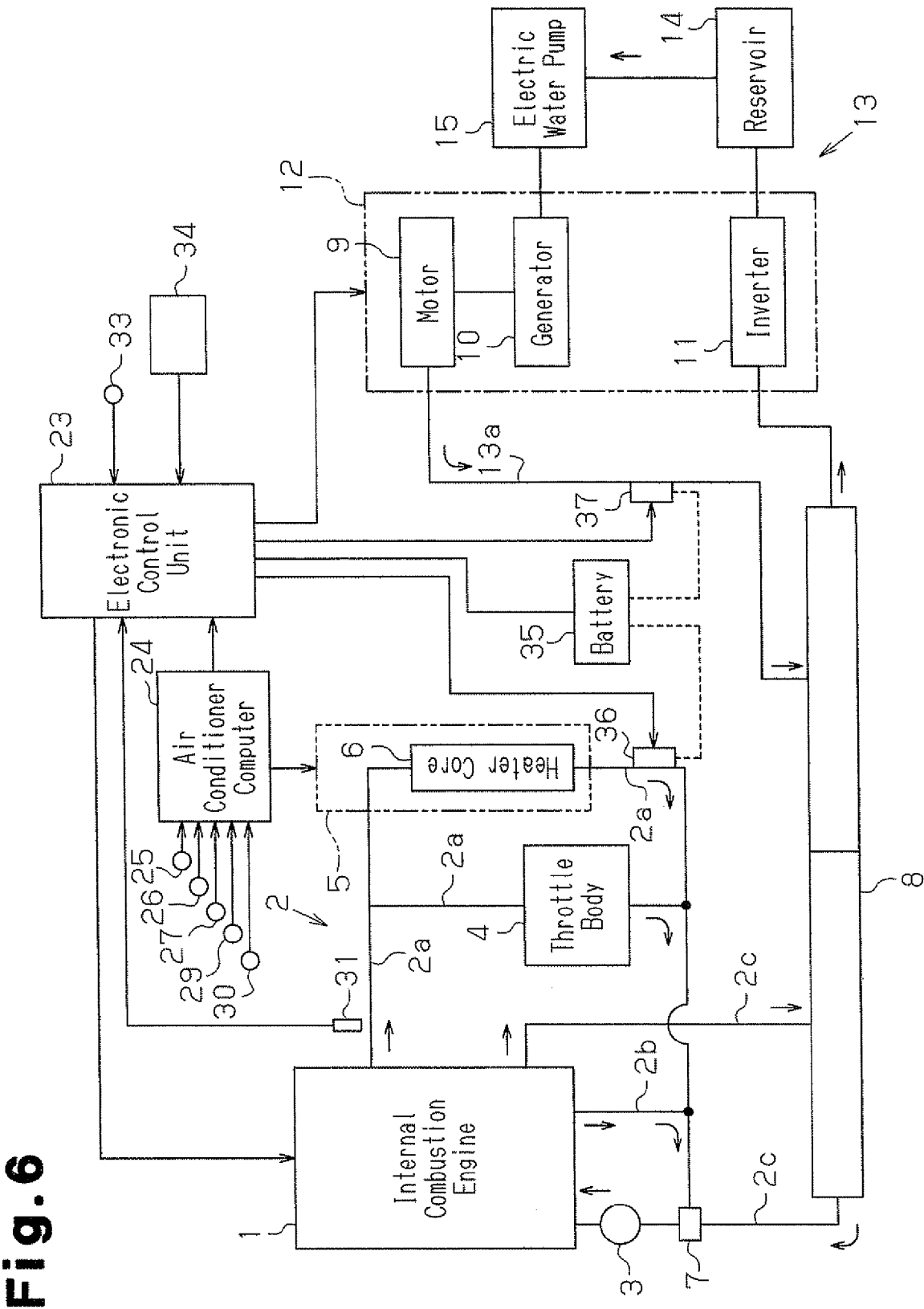
FIG. 6 is a diagram schematically illustrating the configuration of a cooling system in a hybrid vehicle employing a control device according to a second embodiment and the electric configuration of the control device.

As illustrated in FIG. 6, an electrothermal heater 36 is arranged in the passage 2a of the fluid circuit 2 routed through the engine 1. The heater 36 heats coolant in the passage 2a by generating heat using the power supplied from a battery 35. The heater 36 is controlled through the electronic control unit 23. The coolant in the fluid circuit 2 (the passage 2a) is heated by the heater 36 and sent to the engine 1 through the fluid circuit 2. The engine 1 is thus heated by the coolant.

An electrothermal heater 37 is arranged in the passage 13a of the fluid circuit 13 routed through the transaxle 12. The heater 37 heats coolant in the passage 13a by generating heat using the power supplied from the battery 35. The heater 37 is controlled through the electronic control unit 23. The coolant in the fluid circuit 13 (the passage 13a) is heated by the heater 37 and sent to the transaxle 12 through the fluid circuit 13. The transaxle 12 including the motor 9 and the gear portion is thus heated by the coolant.

As the generator 10 is actuated through operation of the engine 1, the battery 35 for supplying the power to the heaters 36, 37 stores the power produced by the generator 10 as the electric energy. The electronic control unit 23 receives a signal corresponding to the charge amount of the battery 35 and detects the charge amount of the battery 35 based on the signal.

In the second embodiment, the battery 35 functions as a storage device for storing energy produced through operation of the engine 1 at the time when the hybrid vehicle is in operation. The heaters 36 and 37 and the fluid circuits 2 and 13 each function as a heating device for heating the engine 1 and the transaxle 12 using the electric energy stored in the battery 35.

Figure 7:
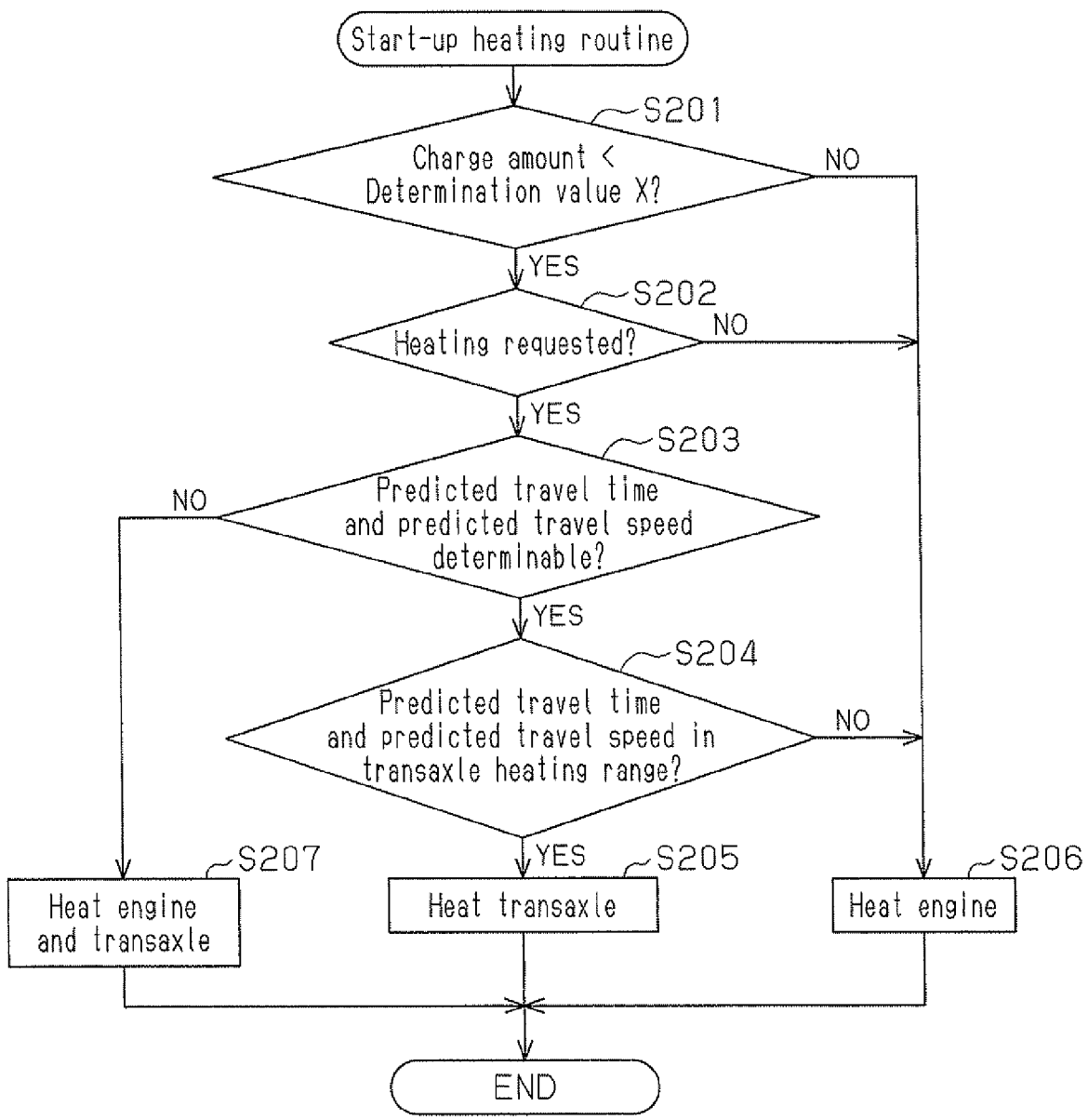
FIG. 7 is a flowchart representing a heating procedure performed when system start-up is initiated in the hybrid vehicle.

FIG. 7 is a flowchart representing the start-up heating routine of the second embodiment. The routine is different from the start-up heating routine (FIG. 2) of the first embodiment only in the procedure (S201) corresponding to step S101 of the routine of the first embodiment.

In the start-up heating routine represented in FIG. 7, it is first determined whether the charge amount of the battery 35 is less than a determination value X (S201). The determination value X is the lower limit of such charge amounts that can increase the engine temperature to the permitting temperature for the intermittent control or higher through heating of the engine 1 by means of the heater 36, which uses the electric energy stored in the battery 35. The determination value X is variably set in correspondence with, for example, the coolant temperature in the fluid circuit 2 corresponding to the engine temperature in such a manner that the determination value X becomes greater as the coolant temperature becomes lower.

When the determination in step 201 is negative, it is indicated that the engine temperature can rise to the permitting temperature or higher through heating by the electric energy stored in the battery 35, or, more specifically, the amount of the aforementioned electric energy is greater than or equal to such a value that can increase the engine temperature to the permitting temperature or higher through heating of the engine 1 using the electric energy. In this case, to allow the heating using the electric energy stored in the battery 35 only on the engine 1, only the heater 36 receives the power from the battery 35 and generates heat (S206). This raises the engine temperature to the permitting temperature or higher, thus executing the intermittent control at an early stage after initiation of the system start-up in the hybrid vehicle. As a result, the fuel efficiency of the engine 1 is improved through the execution of the intermittent control.

If the determination in step S201 is positive, indicating that the charge amount of the battery 35 is less than the determination value X, or, in other words, if it is determined that the heating using the electric energy stored in the battery 35 cannot increase the engine temperature to the permitting temperature or higher, it is determined whether a request for heating the passenger compartment is generated (S202). When negative determination is made in step S202, indicating that no request for heating the passenger compartment is generated, the procedure of step S206 is carried out. That is, the engine 1 is heated by the electric energy stored in the battery 35 even if the charge amount of the battery 35 is less than the determination value X. This ensures execution of the intermittent control in the engine 1 at an early stage after initiation of the system start-up in the hybrid vehicle. The effect of improving the fuel efficiency of the engine 1 through the intermittent control is thus obtained in a wider range.

In contrast, when positive determination is made in step S202, indicating that a request for heating the passenger compartment is generated, the heating target for the electric energy stored in the battery 35 is selected between the engine 1 and the transaxle 12 based on the predicted travel time and the predicted travel speed and the procedure (S203 to S207) for heating the heating target is performed.

In the procedure, it is determined whether the predicted travel time and the predicted travel speed of the hybrid vehicle are determinable (S203). If it is determined that the predicted travel time and the predicted travel speed are determinable, it is determined whether the predicted travel time and the predicted travel speed are in the transaxle heating range represented in FIG. 5 (S204). When the determination in step S204 is positive, only the heater 37 receives the power from the battery 35 to generate heat, in such a manner that the heating by the electric energy stored in the battery 35 is performed only on the transaxle 12 (S205). In contrast, if the determination in step S204 is negative, indicating that the predicted travel time and the predicted travel speed are in the engine heating range represented in FIG. 5, only the heater 36 receives the power from the battery 35 to generate heat, in such a manner that the heating by the electric energy stored in the battery 35 is performed only on the engine 1 (S206).

If it is determined that the predicted travel time and the predicted travel speed are indeterminable in step S203, the heater 36 and the heater 37 both receive the power from the battery 35 to generate heat, in such a manner that the heating by the electric energy stored in the battery 35 is performed on both of the engine 1 and the transaxle 12 (S207).

The second embodiment, which has been described in detail, has the advantages equivalent to the advantages (1) to (4) of the first embodiment.

Third Embodiment

A third embodiment of the present invention will hereafter be described with reference to FIGS. 8 and 9.

The third embodiment is different from the first embodiment in that energy produced through operation of the engine 1 after initiation of system start-up in the hybrid vehicle is used to heat the engine 1 and the transaxle 12 when the engine 1 or the transaxle 12 is cold.

Figure 8:
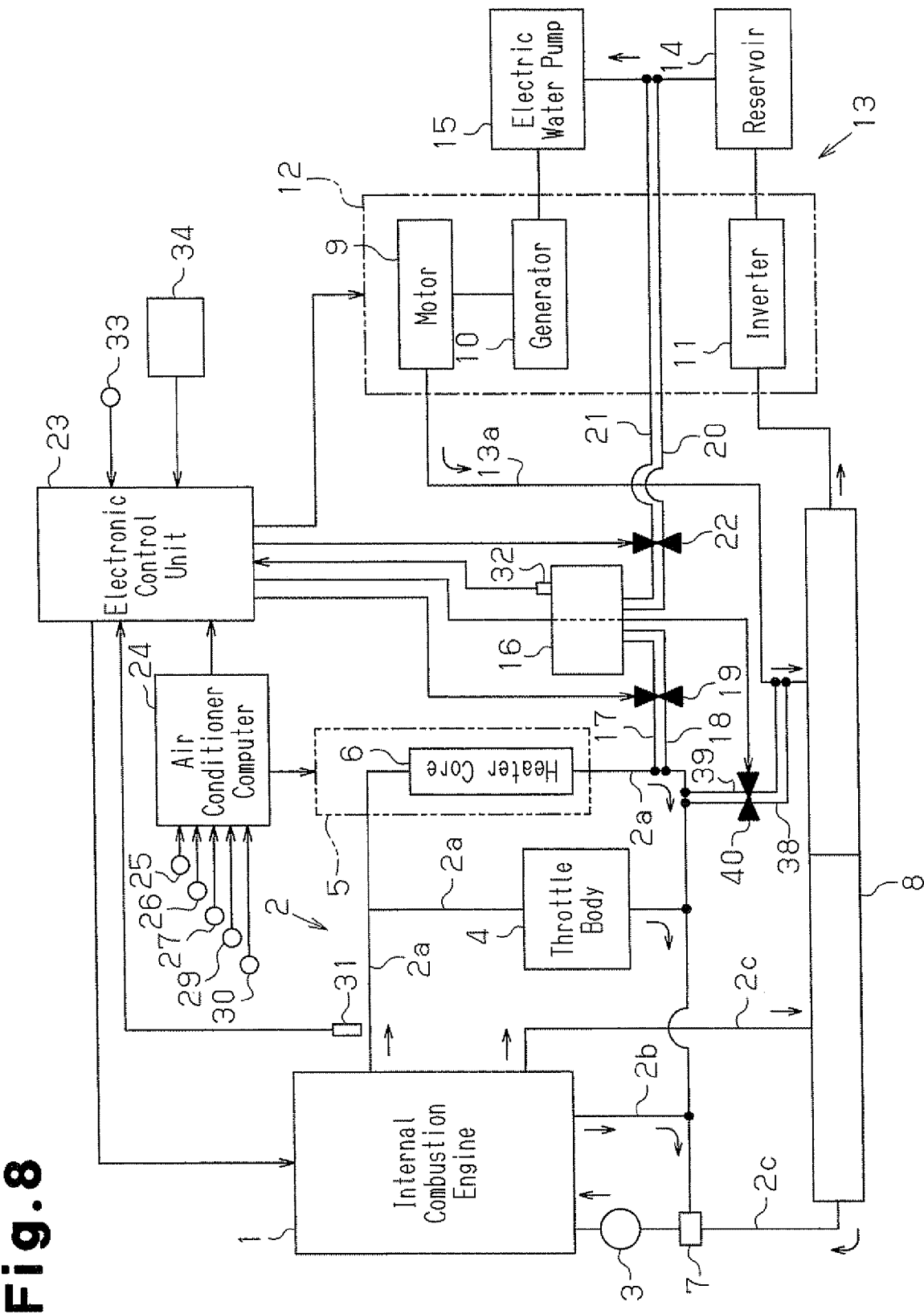
FIG. 8 is a diagram schematically illustrating the configuration of a cooling system in a hybrid vehicle employing a control device according to a third embodiment and the electric configuration of the control device.

As illustrated in FIG. 8, an inlet passage 38 and an outlet passage 39 are connected to the passage 2a of the fluid circuit 2 routed through the engine 1 and the passage 13a of the fluid circuit 13 routed through the transaxle 12 to allow communication between the passage 2a and the passage 13a. A heating control valve 40 is provided in the inlet passage 38 and the outlet passage 39 and selectively opens and closes to correspondingly permit or prohibit the communication between the passage 2a and the passage 13a. The inlet passage 38, the outlet passage 39, and the heating control valve 40 each function as a heating device for heating the engine 1 and the transaxle 12 using thermal energy produced through operation of the engine 1 after initiation of system start-up in the hybrid vehicle.

After the system start-up is initiated in the hybrid vehicle, the engine 1 operates and generates heat. Then, heat exchange occurs between the engine 1 and the coolant flowing in the fluid circuit 2. This transmits the heat from the engine 1 to the coolant in the fluid circuit 2, thus raising the coolant temperature. A temperature rise in the coolant in the fluid circuit 2 indicates thermal energy stored in the fluid circuit 2 in the form of heated coolant. Using the energy produced through operation of the engine 1, which is the thermal energy in the fluid circuit 2, the engine 1 and the transaxle 12 are heated.

Specifically, to heat the engine 1 using the thermal energy in the fluid circuit 2, the heating control valve 40 is closed to prohibit the communication between the passage 2a of the fluid circuit 2 routed through the engine 1 and the passage 13a of the fluid circuit 13 routed through the transaxle 12. In this case, the heated coolant in the fluid circuit 2 routed through the engine 1 circulates in the fluid circuit 2 without flowing into the fluid circuit 13 routed through the transaxle 12. The thermal energy in the fluid circuit 2 is thus prevented from being transmitted to the fluid circuit 13. In other words, the engine 1 is heated by the thermal energy produced directly through the operation of the engine 1.

To heat the transaxle 12 using the thermal energy in the fluid circuit 2, the heating control valve 40 is opened to permit the communication between the passage 2a of the fluid circuit 2 routed through the engine 1 and the passage 13a of the fluid circuit 13 routed through the transaxle 12. In this case, the heated coolant in the fluid circuit 2 (the passage 2a) routed through the engine 1 is sent into the fluid circuit 13 (the passage 13a) routed through the transaxle 12 via the outlet passage 39. Such flow of the coolant is caused by the difference in discharge pressure between the water pump 3 and an electric water pump 15, which causes the pressure in the fluid circuit 2 routed through the engine 1 to become greater than the pressure routed through the transaxle 12. Alternatively, a pump may be arranged in the outlet passage 39 and actuated to send the heated coolant from the fluid circuit 2 routed through the engine 1 into the fluid circuit 2 routed through the transaxle 12. As the heated coolant in the fluid circuit 13 (the passage 13a) is sent into the fluid circuit 13 (the passage 13a), the coolant in the passage 13a flows into the fluid circuit 2 routed through the engine 1.

As the heated coolant is introduced from the fluid circuit 2 routed through the engine 1 to the fluid circuit 13 routed through the transaxle 12, the heated coolant heats the transaxle 12 including the motor 9 and the gear portion. In other words, the transaxle 12 is heated by the thermal energy produced through the operation of the engine 1.

Figure 9:
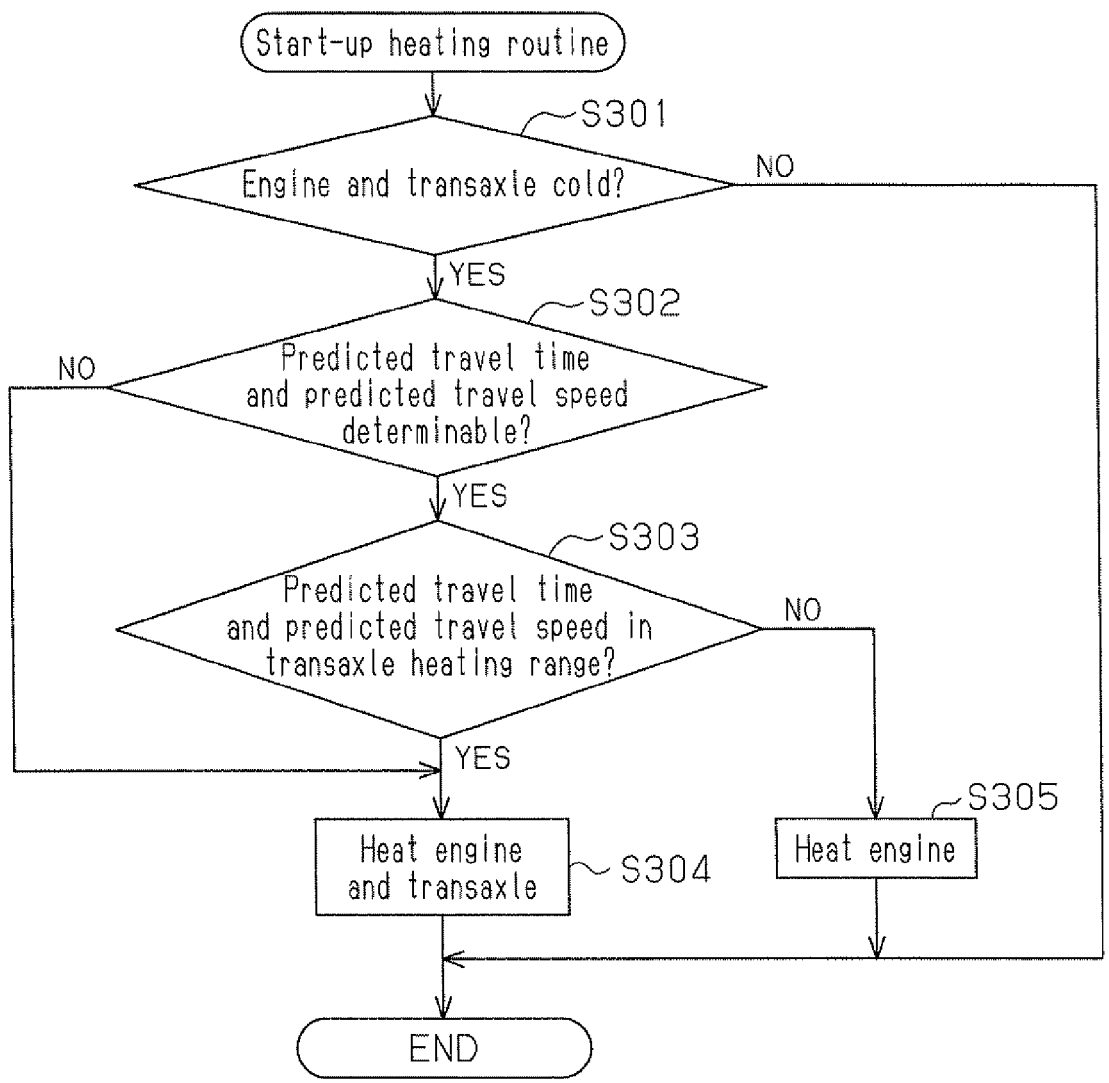
FIG. 9 is a flowchart representing a heating procedure performed after system start-up is initiated in the hybrid vehicle.

FIG. 9 is a flowchart representing a post-start-up heating routine for heating the engine 1 and the transaxle 12 when the engine 1 and the transaxle 12 are cold, using the thermal energy generated through the operation of the engine 1 after initiation of system start-up in the hybrid vehicle. The post-start-up heating routine is performed through the electronic control unit 23 periodically by, for example, time interruption at predetermined time intervals.

In the post-start-up heating routine, it is first determined whether it is likely that the engine 1 and the transaxle 12 are cold (S301). Specifically, such determination is performed based on, for example, whether a maximum warm-up time determined in advance through a test or the like has elapsed since initiation of the system start-up in the hybrid vehicle. If the maximum warm-up time has not elapsed since the initiation of the system start-up and it is determined that the engine 1 and the transaxle 12 are likely to be cold, the heating target for the thermal energy produced through the operation of the engine 1 is selected between the engine 1 and the transaxle 12 and the procedure for heating the heating target is carried out.

In the procedure, it is determined whether the predicted travel time and the predicted travel speed of the hybrid vehicle are determinable (S302). If negative determination is made in step S302, the heating control valve 40 is opened to send the coolant from the fluid circuit 2 routed through the engine 1 to the fluid circuit 13 routed through the transaxle 12 (S304), in such a manner that the heating by the thermal energy produced through the operation of the engine 1 is performed on not only the engine 1 but also the transaxle 12. In contrast, when positive determination is made in step S302, it is determined whether the predicted travel time and the predicted travel speed are in the transaxle heating range represented in FIG. 5 (S303). If the determination in step S303 is positive, the procedure of step S304 is carried out.

If the determination in step S303 is negative, or, in other words, if the predicted travel time and the predicted travel speed are in the engine heating range represented in FIG. 5, the heating control valve 40 is closed in such a manner that the heating by the thermal energy produced through the operation of the engine 1 is carried out only on the engine 1 (S305). This prohibits introduction of the coolant from the fluid circuit 2 routed through the engine 1 to the fluid circuit 13 routed through the transaxle 12. The engine 1 is thus heated by the thermal energy produced directly through the operation of the engine 1.

The third embodiment, which has been described in detail, has the advantages described below, in addition to the advantages (1) to (4) of the first embodiment.

(5) When it is likely that the engine 1 and the transaxle 12 are cold after initiation of system start-up in the hybrid vehicle, the heating target for the thermal energy produced through the operation of the engine 1 is selected between the engine 1 and the transaxle 12 based on the predicted travel time and the predicted travel speed of the hybrid vehicle. Specifically, when the predicted travel time and the predicted travel speed are in the transaxle heating range represented in FIG. 5, not only the engine 1 but also the transaxle 12 is selected as the heating target for the aforementioned thermal energy. When the predicted travel time and the predicted travel speed are in the engine heating range represented in FIG. 5, only the engine 1 is selected as the heating target. Accordingly, such selection of the heating target for the thermal energy is performed in such a manner as to effectively improve the fuel efficiency of the engine 1 at the time when the hybrid vehicle travels for the predicted travel time and at the predicted travel speed. As a result, by selecting the heating target for the thermal energy in the above-described manner and based on the predicted travel distance and the predicted travel speed, the fuel efficiency of the engine 1 is effectively improved.

(6) When it is likely that the engine 1 and the transaxle 12 are cold after initiation of system start-up in the hybrid vehicle and the predicted travel distance and the predicted travel speed are indeterminable, the heating by the thermal energy generated through the operation of the engine 1 is performed on both of the engine 1 and the transaxle 12. Specifically, if the predicted travel time and the predicted travel speed are indeterminable, selection of the heating target for the aforementioned thermal energy between the engine 1 and the transaxle 12 cannot be performed in such a manner as to effectively improve the fuel efficiency of the engine 1. In this case, if the heating by the thermal energy is carried out only on, for example, the engine 1, the heating (selection of the heating target) is likely to become inappropriate. Such inappropriate heating may deteriorate the fuel efficiency of the engine 1 to a great extent disadvantageously. However, if the predicted travel time and the predicted travel speed are indeterminable, the heating by the thermal energy is performed on both of the engine 1 and the transaxle 12. This prevents the aforementioned significant deterioration of fuel efficiency, which may be caused by the heating restricted to the engine 1.

Other Embodiments

The illustrated embodiments may be modified to the forms described below.

In the third embodiment, to heat the transaxle 12 using the thermal energy produced through operation of the engine 1, heat exchange may be caused between the coolant in the passage 2a of the fluid circuit 2 and the lubricant oil for the gear portion of the transaxle 12, instead of sending the coolant from the passage 2a into the fluid circuit 13 routed through the fluid circuit 13.

Figure 10:
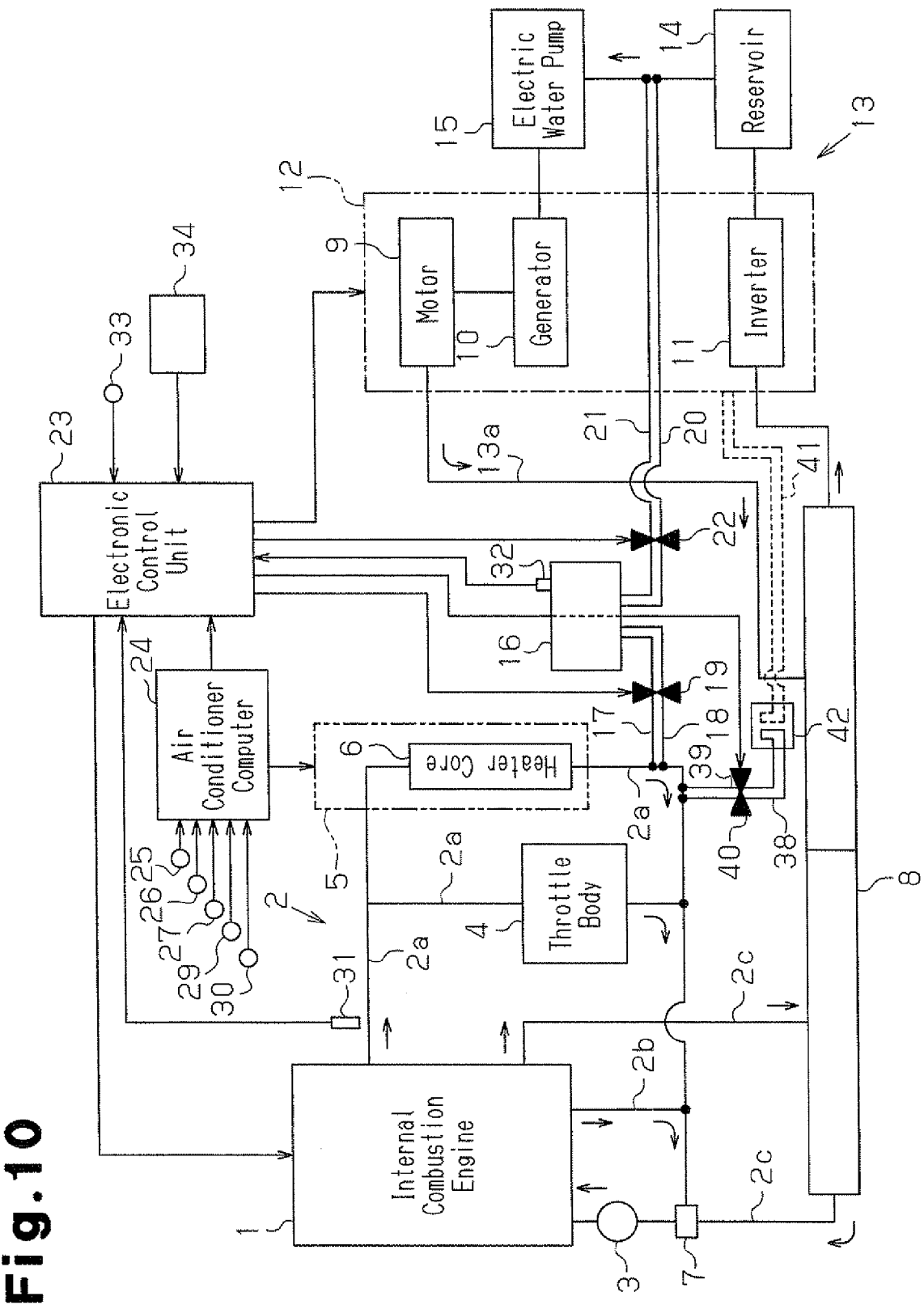
FIG. 10 is a diagram illustrating another example of the control device according to the third invention.

In this case, as illustrated in FIG. 10, an oil warmer 42 is provided in a circulation path 41 of the lubricant oil for the gear portion of the transaxle 12. An inlet passage 38 and an outlet passage 39 are each connected to the oil warmer 42 and the passage 2a of the fluid circuit 2 to permit communication between the oil warmer 42 and the passage 2a. A heating control valve 40 is arranged in the inlet passage 38 and the outlet passage 39 and selectively opens and closes to correspondingly permit or prohibit the communication between the passage 2a and the oil warmer 42. In this example, the inlet passage 38, the outlet passage 39, the heating control valve 40, the circulation path 41, and the oil warmer 42 function as a heating device for heating the engine 1 and the transaxle 12 using the thermal energy generated through the operation of the engine 1 after initiation of system start-up in the hybrid vehicle.

To heat the transaxle 12 using the thermal energy in the fluid circuit 2, the heating control valve 40 is opened to permit the communication between the passage 2a of the fluid circuit 2 routed through the engine 1 and the oil warmer 42. In this case, the heated coolant in the fluid circuit 2 (the passage 2a) routed through the engine 1 is introduced into the oil warmer 42 through the outlet passage 39 and then returned to the fluid circuit 2 via the inlet passage 38. When the coolant flows through the oil warmer 42, heat exchange occurs between the coolant and the oil for the transaxle 12 in the oil warmer 42. This heats the oil for the transaxle 12, and the oil heats the transaxle 12 including the motor 9 and the gear portion. In other words, the transaxle 12 is heated by the thermal energy generated through the operation of the engine 1.

To heat the engine 1 using the thermal energy in the fluid circuit 2, the heating control valve 40 is closed to prohibit the communication between the passage 2a of the fluid circuit 2 routed through the engine 1 and the oil warmer 42. In this state, the heated coolant in the fluid circuit 2 routed through the engine 1 circulates in the fluid circuit 2 without flowing through the oil warmer 42. This prevents the thermal energy in the fluid circuit 2 from being transmitted to the oil for the transaxle 12. In other words, the engine 1 is heated by the thermal energy produced through the operation of the engine 1.

In the third embodiment, thermal energy produced by exhaust gas from the engine 1 and electric energy generated through actuation of the generator 10 at the time of operation of the engine 1 may be employed as the energy generated through the operation of the engine 1. The engine 1 and the transaxle 12 may be heated using these energies. To heat the engine 1 and the transaxle 12 using the electric energy, the electric energy may be used to cause a heater to generate heat for heating the engine 1 and the transaxle 12. To heat the engine 1 and the transaxle 12 using the thermal energy produced by the exhaust gas, the exhaust gas may directly heat the engine 1 or the transaxle 12. Alternatively, the heat of the exhaust gas may be converted into electric energy using a thermoelectric power generating unit. The obtained thermal energy may be used to cause a heater to generate heat for heating the engine 1 and the transaxle 12.

In the first and third embodiments, when the amount of the heat stored in the heat storage container 16 exceeds the determination value MJ at the time of initiation of the system start-up in the hybrid vehicle and it is determined that the engine temperature can be raised to the permitting temperature or higher through heating by the thermal energy stored in the heat storage container 16, the engine 1 is heated using the thermal energy. In addition to this, the transaxle 12 may be heated in the manner described below. Specifically, if some of the thermal energy stored in the heat storage container 16 remains unconsumed after the engine temperature is increased to the permitting temperature or higher by heating the engine 1 using the thermal energy, the unconsumed thermal energy may be used to heat the transaxle 12. This further improves the engine fuel efficiency.

In the second embodiment, when the charge amount of the battery 35 exceeds the determination value X at the time of the initiation of the system start-up in the hybrid vehicle and it is determined that the engine temperature can be raised to the permitting temperature or higher through heating by the electric energy stored in the battery 35, the engine 1 is heated using the electric energy. In addition to this, the transaxle 12 may be heated in the manner described below. Specifically, if some of the electric energy stored in the battery 35 remains unconsumed after the engine temperature is raised to the permitting temperature or higher by heating the engine 1 using the electric energy, the unconsumed thermal energy may be used to heat the transaxle 12. This further improves the engine fuel efficiency.

In the first and second embodiments, when no request for heating the passenger compartment is generated at the time of the initiation of the system start-up in the hybrid vehicle, only the engine 1 is heated by the stored energy even if the amount of the stored energy is less than the determination value. However, such procedure does not necessarily have to be carried out.

In the first to third embodiments, to determine the predicted travel time and the predicted travel speed of the hybrid vehicle, the travel history of the hybrid vehicle may be recorded. The predicted travel time and the predicted travel speed are determined based on the travel history. Alternatively, the predicted travel time and the predicted travel speed may be set manually by an occupant of the vehicle. The predicted travel time and the predicted travel speed are determined through such manual setting.

The technique of the third embodiment may be used in the second embodiment.

The invention claimed is:

1. A control device for a hybrid vehicle having an internal combustion engine and a motor as drive sources, the hybrid vehicle being capable of performing drive-by-motor operation in which the engine is stopped and only the motor is operated as the drive source, the control device carrying out an intermittent control, in which, when an engine temperature is greater than or equal to a permitting temperature, the drive-by-motor operation is performed on condition that a prescribed executing condition is satisfied, and the control device prohibiting execution of the intermittent control when the engine temperature is less than the permitting temperature, the control device comprising:

a transaxle in which the motor, a generator, and an inverter are mounted;

a storage device for storing energy produced through the operation of the engine after initiation of system start-up in the vehicle;

a heating device for heating at least one of the engine and the transaxle using the energy stored in the storage device at the time of the initiation of the system start-up in the vehicle; and a control section for controlling the heating device to perform heating on the engine using the energy stored in the storage device when the engine temperature can be raised to the permitting temperature or higher through the heating by the energy at the time of the initiation of the system start-up in the vehicle.

2. The control device for a hybrid vehicle according to claim 1, further comprising a travel prediction determining section for determining a predicted travel time and a predicted travel speed of the hybrid vehicle at the time of the initiation of the system start-up in the hybrid vehicle, wherein:

when the engine temperature cannot be raised to the permitting temperature or higher through the heating by the energy stored in the storage device, the control section performs the heating by the energy selectively on one of the engine and the transaxle based on the predicted travel time and the predicted travel speed determined by the travel prediction determining section; and the control section selects a target of the heating between the engine and the transaxle in such a manner as to improve the fuel efficiency of the engine at the time when the vehicle will have traveled for the predicted travel time and at the predicted travel speed.

3. The control device for a hybrid vehicle according to claim 2, wherein, when the engine temperature cannot be raised to the permitting temperature or higher through the heating by the energy stored in the storage device and the predicted travel time and the predicted travel speed are indeterminable for the travel prediction determining section, the control section performs the heating by the energy on both of the engine and the transaxle.

4. The control device for a hybrid vehicle according to claim 1, further comprising a fluid circuit for circulating heat exchanging fluid that flows through the engine to exchange heat with the engine and an air conditioner for heating a passenger compartment using heat of the heat exchanging fluid, wherein:

the storage device collects and stores, as a thermal energy, the heat exchanging fluid that has been heated in the fluid circuit;

by supplying the heated heat exchanging fluid stored in the storage device to at least one of the fluid circuit and the transaxle, the heating device heats the corresponding one(s) of the engine and the transaxle; and even when it is determined that the engine temperature cannot be raised to the permitting temperature or higher through the heating by the thermal energy stored in the storage device, the control section controls the heating device to perform the heating by the thermal energy stored in the storage device on the engine as long as no request for heating the passenger compartment is generated.

5. The control device for a hybrid vehicle according to claim 4, further comprising a travel prediction determining section for determining a predicted travel time and a predicted travel speed of the hybrid vehicle at the time of the initiation of the system start-up in the hybrid vehicle, wherein:

when it is determined that the engine temperature cannot be raised to the permitting temperature or higher through the heating by the thermal energy stored in the storage device and a request for heating the passenger compartment is generated, the control section performs the heating by the thermal energy selectively on one of the engine and the transaxle based on the predicted travel time and the predicted travel speed determined by the travel prediction determining section; and the control section selects a target of the heating between the engine and the transaxle in such a manner as to improve the fuel efficiency of the engine at the time when the vehicle will have traveled for the predicted travel time and at the predicted travel speed.

6. The control device for a hybrid vehicle according to claim 5, wherein, when it is determined that the engine temperature cannot be raised to the permitting temperature or higher through the heating by the thermal energy stored in the storage device, a request for heating the passenger compartment is generated, and the predicted travel time and the predicted travel speed are indeterminable for the travel prediction determining section, the control section performs the heating by the thermal energy on both of the engine and the transaxle.

7. The control device for a hybrid vehicle according to claim 1, further comprising a travel prediction determining section for determining a predicted travel time and a predicted travel speed of the hybrid vehicle at the time of the initiation of the system start-up in the hybrid vehicle, wherein:

the heating device heats at least one of the engine and the transaxle using the energy produced through the operation of the engine after the initiation of the system start-up in the hybrid vehicle;

the control section performs the heating by the energy selectively on one of the engine and the transaxle based on the predicted travel time and the predicted travel speed determined by the travel prediction determining section; and the control section selects a target of the heating between the engine and the transaxle in such a manner as to improve the fuel efficiency of the engine at the time when the vehicle will have traveled for the predicted travel time and at the predicted travel speed.

8. The control device for a hybrid vehicle according to claim 7, wherein, when the predicted travel time and the predicted travel speed are indeterminable for the travel prediction determining section, the control section performs the heating by the energy on both of the engine and the transaxle.

* * * * *